United States Patent
Rahimpour et al.

(10) Patent No.: US 12,466,422 B2
(45) Date of Patent: Nov. 11, 2025

(54) LARGE ANIMAL DETECTION AND INTERVENTION IN A VEHICLE

(71) Applicant: Ford Global Technologies, LLC, Dearborn, MI (US)

(72) Inventors: Alireza Rahimpour, Palo Alto, CA (US); Navid Fallahinia, Watertown, MA (US); Devesh Upadhyay, Canton, MI (US); Justin Miller, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 18/161,290

(22) Filed: Jan. 30, 2023

(65) Prior Publication Data
US 2024/0253652 A1 Aug. 1, 2024

(51) Int. Cl.
*B60W 50/14* (2020.01)
*B60W 30/095* (2012.01)
*B60W 50/00* (2006.01)
*G06V 10/25* (2022.01)
*G06V 10/75* (2022.01)
(Continued)

(52) U.S. Cl.
CPC ........ *B60W 50/14* (2013.01); *B60W 30/0956* (2013.01); *B60W 50/0097* (2013.01); *G06V 10/25* (2022.01); *G06V 10/751* (2022.01); *G06V 10/82* (2022.01); *G06V 20/58* (2022.01); *G06V 40/10* (2022.01); *H04N 23/23* (2023.01); *B60W 2050/146* (2013.01); *B60W 2420/403* (2013.01);
(Continued)

(58) Field of Classification Search
CPC ............. B60W 50/14; B60W 30/0956; B60W 50/0097; B60W 2050/146; B60W 2420/403; B60W 2554/4045; B60W 2556/10; G06V 10/25; G06V 10/751; G06V 10/82; G06V 20/58; G06V 40/10; H04N 23/23
See application file for complete search history.

(56) References Cited

U.S. PATENT DOCUMENTS 12,128,887 B1 * 10/2024 Kiiski ................... G06V 20/58
12,159,481 B2 * 12/2024 Quinn ................ G07F 17/3237
(Continued)

FOREIGN PATENT DOCUMENTS

WO    2018132608 A2    7/2018

OTHER PUBLICATIONS

Huang, Y. et al., "Head Pose based Intention Prediction Using Discrete Dynamic Bayesian Network," Seventh International Conference on Distributed Smart Cameras, 2013, 6 pages.
(Continued)

*Primary Examiner* — Quan Zhen Wang
*Assistant Examiner* — Rajsheed O Black-Childress
(74) *Attorney, Agent, or Firm* — Frank A. MacKenzie; Brooks Kushman P.C.

(57) ABSTRACT

A far-infrared camera mounted in a vehicle generates an image frame. When an image of a large animal is identified in the image frame, a pixel intensity of the large animal image is determined. An estimated distance to the large animal from the far-infrared camera based on the pixel intensity is determined. When the animal is classified as a tracked animal, and future trajectories of the tracked animal and the vehicle intersect, a component in the vehicle is actuated.

18 Claims, 11 Drawing Sheets

(51) Int. Cl.
G06V 10/82 (2022.01)
G06V 20/58 (2022.01)
G06V 40/10 (2022.01)
H04N 23/23 (2023.01)

(52) U.S. Cl.
CPC . B60W 2554/4045 (2020.02); B60W 2556/10 (2020.02)

(56) References Cited

U.S. PATENT DOCUMENTS

| | | | |
|---|---|---|---|
| 2017/0327112 A1* | 11/2017 | Yokoyama | B60W 50/0097 |
| 2020/0294266 A1* | 9/2020 | Botonjic | G01S 17/89 |
| 2021/0201052 A1 | 7/2021 | Ranga et al. | |
| 2021/0295171 A1 | 9/2021 | Kamenev et al. | |
| 2022/0057806 A1* | 2/2022 | Guo | G06V 20/58 |
| 2022/0101635 A1 | 3/2022 | Koivisto et al. | |
| 2023/0237873 A1* | 7/2023 | Quinn | G06V 10/82 382/103 |
| 2024/0073545 A1* | 2/2024 | Wilton | H04N 25/62 |

OTHER PUBLICATIONS

Vidal, M. et al., "Perspectives on Individual Animal Identification from Biology and Computer Vision," Integrated and Comparative Biology, vol. 61, No. 3, Jan. 2021, pp. 900-916.
Ukwuoma, C. et al., "Animal species detection and classification framework based on modified multi-scale attention mechanism and feature pyramid network," Scientific African, 2022, 18 pages.
Vecvanags, A. et al., "Ungulate Detection and Species Classification from Camera Trap Images Using RetinaNet and Faster R-CNN," entropy, 2022, 13 pages.
Adams, E., "Volvo's cars now spot moose and hit the Brakes for You," www.wired.com, Jan. 27, 2017, 7 pages.
Ahmed. S. et al., "Pedestrian and Cyclist Detection and Intent Estimation for Autonomous Vehicles: A Survey," Applied Sciences, 2019, 38 pages.
Fang, Z. et al., "On-Board Detection of Pedestrian Intentions," Sensors, 2017, 15 pages.
Gupta, A. et al., "Social GAN: Socially Acceptable Trajectories with Generative Adversarial Networks," arXiv:1803.10892v1 [cs.CV], Mar. 29, 2018, 10 pages.
Keller, C. et al., "Will the Pedestrian Cross? A Study on Pedestrian Path Prediction," IEEE Transactions on Intelligent Transportation Systems, Apr. 2014, 14 pages.
Kooij, J. et al., "Context-based Pedestrian Path Prediction," ECCV, 2014, 3 pages.
Malla, S. et al., "Titan: Future Forecast using Action Priors," Computer Vision Foundation, 2020, 11 pages.
Rasouli, R. et al., "PIE: A Large-Scale Dataset and Models for Pedestrian Intention Estimation and Trajectory Prediction," Computer Vision Foundation, 2019, 10 pages.
Rasouli, A. et al., "Are They Going to Cross? A Benchmark Dataset and Baseline for Pedestrian Crosswalk Behavior," Computer Vision Foundation, 2017, 8 pages.
Ridel, D. et al., "A Literature Review on the Prediction of Pedestrian Behavior in Urban Scenarios," 21st International Conference on Intelligent Transportation Systems, Nov. 2018, 8 pages.
Schulz, A. et al., "Pedestrian Intention Recognition using Latent-dynamic Conditional Random Fields," IEEE Intelligent Vehicles Symposium, 2015, 6 pages.
Hore, P. et al., "A Comprehensive Guide to Attention Mechanism in Deep Learning for Everyone," www.analyticsvidhya.com, Nov. 20, 2019, 18 pages.

Ren, S. et al., "Faster R-CNN: Towards Real-Time Object Detection with Region Proposal Networks," arXiv:1506.01497v3 [cs.CV], Jan. 6, 2016, 14 pages.
Mur-Artal. R. et al., "ORB-SLAM: A Versatile and Accurate Monocular SLAM System," IEEE Transactions on Robotics, vol. 31, Issue 5, Oct. 2015, 33 pages.
Vaswani, A. et al., "Attention Is All You Need," 31st Conference on Neural Information Processing Systems, 2017, 11 pages.
Park, J. et al., "Deep Learning Based Detection of Missing Tooth Regions for Dental Implant Planning in Panoramic Radiographic Images," Applied Sciences, 2022, 10 pages.
Gupta, P. et al., "Skin Lesion Detection using VGG-16 and ResNet-50 based Hybrid CNN Model," International Journal of Creative Research Thoughts, vol. 10, Issue 6, Jun. 6, 2022, 8 pages.
Tan, M. et al., "Animal Detection and Classification from Camera Trap Images Using Different Mainstream Object Detection Architectures," animals, 2022, 16 pages.
Li, W. et al., "Multiple attention-based encoder-decoder networks for gasmeter character recognition," Scientific Reports, Jun. 20, 2022, 35 pages.
"Deep Learning," Wikipedia, 2022, 41 pages.
Keldenich, T. et al., "What is Attention Mechanism in Deep Learning?—Quickly Understand," Inside Machine Learning, Oct. 20, 2021, 11 pages.
Clark, D. et al., "Using Machine Learning Methods to Predict the Movement Trajectories of the Louisiana Black Bear," SMU Data Science Review, vol. 5, No. 1, 2021, 28 pages.
"How is RELU used on convolutional layer," Cross Validated, 2019, 2 pages.
Brownlee, J., "How Does Attention Work in Encoder-Decoder Recurrent Neural Networks," Machine Learning Mastery, Oct. 13, 2017, 29 pages.
Cristina, S., "A Tour of Attention-Based Architectures," Machine Learning Mastery, Aug. 30, 2022, 17 pages.
Rizzoli, A., "Annotating With Bounding Boxes: Quality Best Practices," www.v7labs.com/blog, Oct. 3, 2022, 14 pages.
Mansouri, I., "Computer Vision Part 8: Pose Estimation, stick figures using AI," Jul. 28, 2020, 21 pages.
"How to Classify Animal Images via a Convolutional Neural Network," https://hackernoon.com, Jul. 29, 2020, 17 pages.
Paul. S., et al., "Keypoint Detection with Transfer Learning," Keras, May 2, 2021, 11 pages.
Yang, Y. et al., "APT-36K: A Large-scale Benchmark for Animal Pose Estimation and Tracking," arXiv:2206.05683v2 [cs.CV], Oct. 3, 2022, 19 pages.
"Convolutional neural network," Wikipedia, 2022, 35 pages.
"What is a convolutional neural network?" www.wgu.edu, Aug. 3, 2020, 8 pages.
"Zero to Hero: Guide to Object Detection using Deep Learning: Faster R-CNN, YOLO, SSD," CV-Tricks.com, 2022, 12 pages.
Ulhaq, A. et al., "Automated Detection of Animals in Low-Resolution Airborne Thermal Imagery," remote sensing, 2021, 14 pages.
Vidal, M. et al., "Perspectives on Individual Animal Identification from Biology and Computer Vision," Integrative and Comparative Biology, vol. 61, No. 3, Jan. 2021, pp. 900-916.
Yu, H. et al., "AP-10K: A Benchmark for Animal Pose Estimation in the Wild," 35th Conference on Neural Information Processing Systems, 2021, 12 pages.
Cao, J. et al., "Cross-Domain Adaptation for Animal Pose Estimation," Computer Vision Foundation, 2019, 10 pages.
Mowen, D. et al., "Improving Road Safety during Nocturnal Hours by Characterizing Animal Poses Utilizing CNN-based Analysis of Thermal Images," sustainability, 2022, 15 pages.

* cited by examiner

LARGE ANIMAL DETECTION AND INTERVENTION IN A VEHICLE

BACKGROUND

A thermal camera is able to detect objects even in poor light conditions. Such a camera will present images of all sources of infrared radiation. Such sources, or objects, may include warm-blooded animals. A thermal camera may be mounted in a vehicle to provide a vehicle operator with information on the presence of objects in a path of the vehicle.

DETAILED DESCRIPTION

Figure 1:
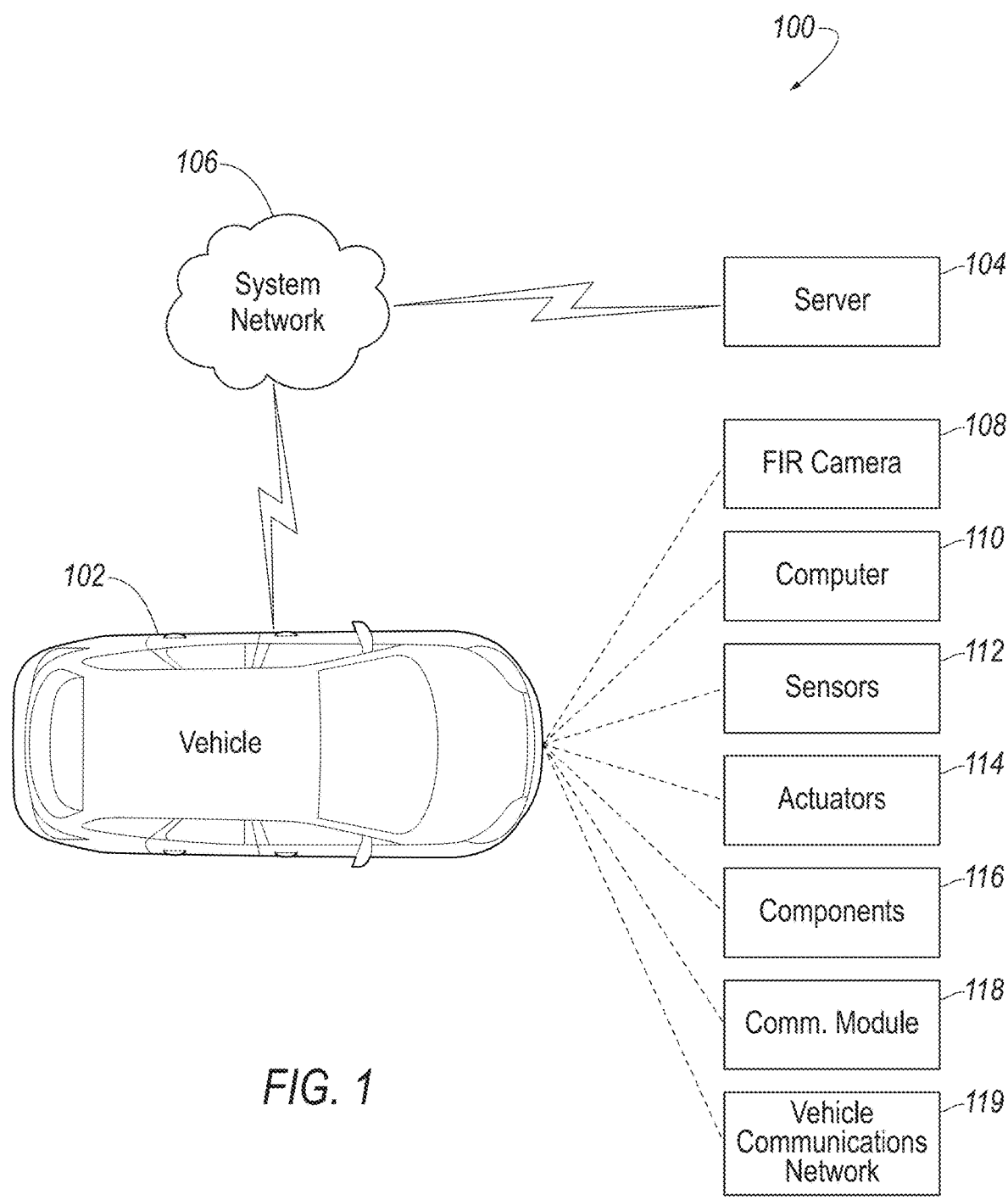
FIG. 1 is a block diagram illustrating an example large animal intervention system.

As described herein, a large animal intervention system in a vehicle may issue an intervention when a predicted trajectory of a large animal and a predicted trajectory of the vehicle intersect. The intervention may be a visual notification to a vehicle operator. The visual notification may be projected in a line-of-sight of the vehicle operator by a heads-up display system, for example. The large animal may first be detected with the use of a far-infrared camera. When the animal is detected, the animal is classified according to a plurality of factors relating to a potential for the vehicle and the animal being in a common location at a common time. When there is sufficient concern that the animal may cross paths with the vehicle, the animal is of sufficient interest to merit it being classified as a tracked animal. A predicted trajectory is generated for the tracked animal. A predicted trajectory is also generated for the vehicle. No predicted trajectory is generated for animals not classified as tracked animals, i.e., for non-tracked animals. Restricting predictions of trajectories to the vehicle and to the tracked animals beneficially filters the images, increasing an accuracy of the predictions and reducing the computational cost of tracking. Such a reduction in the computational cost may be realized because the non-tracked animals are ignored once so classified. Once it is determined that the predicted future trajectories of the vehicle and the tracked animal intersect, the visual notification is provided to the driver.

Predicting a future trajectory of a large animal near a road may aid in reducing vehicle-to-animal collisions. Such a prediction can be used with a range of interventions. At a first level, such a prediction may be used to provide a driver a notification of an actual or anticipated presence of a large animal in a path of the vehicle. Alternatively or additionally, the prediction may be used to actuate the vehicle brakes, steering, and/or propulsion, e.g., in a vehicle equipped with one or more Advanced Driver Assistance Systems (ADAS). Yet further alternatively or additionally, a vehicle equipped to operate as a fully autonomous vehicle may use the prediction to try to avoid the animal.

Predicting a trajectory of a large animal begins with first detecting the animal. Thermal cameras, one type being far-infrared cameras, can be used to detect animals in both low light and light-obscured conditions. Thermal cameras provide images with high contrast between warm blooded animals and the surrounding environment (vegetation, roads, etc.) in all lighting conditions (night, sun glare, etc.) and all weather conditions (fog, rain, etc.) that is superior to the contrast provided by cameras limited to the visible light region.

Advantageously, as described herein, a computing device comprises a processor and a memory. The memory stores instructions executable by the processor such that the computer is programmed to execute such instructions. Upon identifying an image of a large animal in an image frame obtained with a far-infrared camera mounted to a vehicle, several steps are taken. Those steps include the following. A pixel intensity of the large animal image is determined. An estimated distance to the large animal from the far-infrared camera is determined based on the pixel intensity. When the large animal is classified as a tracked animal and it is determined that a future trajectory of the tracked animal and a future trajectory of the vehicle intersect, a component in the vehicle is actuated.

The computing device may be further programmed in accord with the below in support of potentially initiating any intervention as per the below clauses. To the extent that such features are not mutually exclusive, they may be combined with each other.

A sequence of image frames may be generated. The future trajectory of the tracked animal may be predicted based on a past trajectory of the tracked animal, a scene context, and a pixel motion.

The large animal may be classified as one of the tracked animal and a non-tracked animal based on the large animal image and a scene context including the estimated distance to the large animal.

A bounding box that bounds an image of the large animal may be generated.

Prior to classifying the large animal, the estimated distance may be determined based on both the pixel intensity and on a size of the bounding box.

A sequence of image frames may be generated. The past trajectory of the tracked animal may be determined based on a movement of the bounding box of the large animal image in the sequence of the image frames.

A sequence of image frames may be generated. The future trajectory of the large animal may be determined based on a motion of pixels in the sequence of the image frames.

Prior to classifying the large animal, key points of the large animal image and their respective locations may be identified in the image frames to determine a pose of the large animal and include the pose as a factor in classifying the large animal image.

A sequence of image frames may be generated. The future trajectory of the tracked animal may be predicted by modeling the future trajectory with a convolutional long short term memory attention-based multi-stream encoder-decoder model that includes an attention module that assigns weights to vectors derived from a past trajectory of the tracked animal, a scene context, and a pixel motion.

The component actuated may comprise a heads-up display that displays a visual notification of the tracked animal to a vehicle operator.

A method of predicting a future trajectory of a large animal and actuating a component is set forth below. Upon identifying an image of a large animal in an image frame obtained with a far-infrared camera mounted to a vehicle, several further steps are taken. Those steps include the following. A pixel intensity of the large animal image is determined. An estimated distance to the large animal from the far-infrared camera is determined based on the pixel intensity. When the large animal is classified as a tracked animal and it is determined that a future trajectory of the tracked animal and a future trajectory of the vehicle intersect, a component in the vehicle is actuated.

Additional steps that may be included are set forth below. Such additional steps may be combined with each other to the extent that they are not mutually exclusive.

A sequence of image frames may be generated. The future trajectory of the tracked animal may be predicted based on a past trajectory of the tracked animal, a scene context, and a pixel motion.

The large animal may be classified as one of the tracked animal and a non-tracked animal based on the large animal image and a scene context including the estimated distance to the large animal.

A bounding box that bounds an image of the large animal may be generated.

Prior to classifying the large animal, the estimated distance may be determined based on both the pixel intensity and on a size of the bounding box.

A sequence of image frames may be generated. The past trajectory of the tracked animal may be determined based on a movement of the bounding box of the large animal image in the sequence of the image frames.

A sequence of image frames may be generated. The future trajectory of the tracked animal may be determined based on a motion of pixels in the sequence of the image frames.

Prior to classifying the large animal image, key points of the large animal image and their respective locations may be identified in the image frames to determine a pose of the large animal and include the pose as a actor in classifying the large animal image.

A sequence of image frames may be generated. The future trajectory of the tracked animal may be predicted by modeling the future trajectory with a convolutional long short term memory attention-based multi-stream encoder-decoder model that includes an attention module that assigns weights to vectors derived from a past trajectory of the tracked animal, a scene context, and a pixel motion.

The component actuated may comprise a heads-up display that displays a visual notification of the tracked animal to a vehicle operator.

With reference to FIGS. 1-13, a large animal intervention system and a method for intervening when a predicted trajectory of a large animal intersects a predicted trajectory of a vehicle are disclosed.

With particular reference to FIG. 1, an example large animal intervention system 100 can include the following example elements: a vehicle 102, a server 104, and a system network 106.

The vehicle 102 includes a far-infrared camera ("FIR camera") 108 mounted thereto, a vehicle computer 110, a plurality of vehicle sensors 112, a plurality of vehicle actuators 114, a plurality of vehicle components 116, a vehicle communications module 118, and a vehicle communication network 119.

The electromagnetic spectrum may be broken into regions including, starting with the longest wavelengths and correspondingly, the lowest frequency: the radio region (including microwaves), the infrared region, the visible light region, the ultraviolet region, the x-ray region, and the gamma ray region. The infrared region extends from wavelengths of approximately one millimeter (a frequency of 300 GHz) to approximately 700 nanometers (a frequency of approximately 430,000 GHz).

The infrared region may itself be broken into subregions. The shorter wavelength (higher frequency) portion of the infrared region is closer to the visible light region, with a wavelength range of 0.70 to 1.4 micrometers (correspondingly, a frequency range of 430,000 to 214,000 GHz), may be referred to as a near-infrared subregion. Additional, longer wavelength subregions, include a short wavelength infrared subregion with a wavelength range of 1.4 to 3 micrometers (214,000 GHz to 100,000 GHz), a mid-wavelength infrared subregion with a wavelength range of 3 to 8 micrometers (100,000 to 37,000 GHz), a long-wavelength infrared subregion with a wavelength range of 8 to 15 micrometers (37,000 to 20,000 GHz), and far-infrared subregion with a wavelength range of 15 to 1000 micrometers (20,000 to 300 GHz). The naming of the far-infrared subregion is consistent with it being the furthest of the infrared subregions from the visible light region. An alternative definition of the far-infrared subregion consolidates the three farthest subregions, mid-wavelength, long wavelength, and the far-infrared into a single subregion with a wavelength range of 3 to 1000 micrometers (frequency of 100,000 to 300 GHz).

A camera can detect infrared radiation associated with an anticipated temperature range of warm-blooded animals. The long wavelength subgroup, with a wavelength range of 8 to 15 micrometers and frequency range of 37,000 to 20,000 GHz, is associated with a temperature range of 89 degrees Celsius to minus 80 degrees Celsius. That temperature range, 89 degrees Celsius to minus 80 degrees Celsius, includes the temperature range of most interest for this disclosure. Cameras suited for this range of operation, sensing electromagnetic radiation having a wavelength range of 8 to 15 micrometers and frequency range of 37,000 to 20,000 GHz, and a temperature range of 89 degrees Celsius to minus 80 degree Celsius, are commercially available. Consistent with the above-described ambiguity regarding the use of the term far-infrared, commercially available cameras that are suited for the desired range of operation are variously identified as far-infrared cameras ("FIR cameras"), or long wavelength infrared cameras ("LWIR cameras"), or forward looking infrared ("FLIR cameras") or thermal imaging cameras. In this description, although the term far-infrared camera will be used for cameras 108 able to sense electromagnetic radiation in the wavelength range of 8 to 15 micrometers and in the frequency range of 37,000 to 20,000 GHz and in the temperature range of 89 degrees Celsius to minus 80 degree Celsius, any use of any of the preceding optional camera names may be replaced by the other without effect. Far-infrared cameras 108 have been used to detect animals in both low light and light-obscured conditions. Far-infrared cameras 108 provide images with high contrast between warm blooded animals and the surrounding environment, e.g. vegetation, roads, structures, in all lighting conditions (night, sun glare, etc.) and in all weather conditions, e.g., fog, rain, snow, that are superior to the contrast provided by cameras limited to the visible light, i.e., red/green/blue ("RGB") region.

In the context of the present disclosure, a vehicle component 116 is one or more hardware components adapted to perform a mechanical or electro-mechanical function or operation-such as moving the vehicle 102, slowing or stopping the vehicle 102, steering the vehicle 102, etc. Non-limiting examples of components 116 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more restraint systems (e.g., airbags), a movable seat, a door lock component, a heads-up display system, etc.

The vehicle actuators 114 are implemented via circuits, chips, or other electronic and or mechanical components that can actuate various vehicle subsystems in accordance with appropriate control signals as is known. The actuators 114 may be used to control components 116, including brake components for braking, propulsion components for acceleration, steering components for steering of a vehicle 102, and door lock components for locking vehicle doors.

In addition to the far-infrared camera 108, the vehicle 102 may incorporate a plurality of additional vehicle sensors 112. For example, vehicle sensors 112 may include a variety of devices such as are known to provide data to the vehicle computer 110. For example, the sensors 112 may include Light Detection And Ranging (LIDAR) sensor(s) 112, etc., disposed on a top of the vehicle 102, behind a vehicle 102 front windshield, around the vehicle 102, etc., that provide relative locations, sizes, and shapes of objects, including people, surrounding the vehicle 102. As another example, one or more radar sensors 112 fixed to bumpers of the vehicle 102 may provide data to provide locations of the objects, second vehicles, etc., relative to the location of the vehicle 102. The sensors 112 may further include, for example, visible light cameras 112, e.g., front view, side view, 360° view, etc., providing images from an area surrounding the vehicle 102. As another example, the vehicle 102 can include one or more sensors 112, e.g., visible light cameras 112, mounted inside a cabin of the vehicle 102 and oriented to capture images of users, including a vehicle operator, in the vehicle 102 cabin. In the context of this disclosure, an object is a physical, i.e., material, item that has mass and that can be represented by physical phenomena (e.g., light or other electromagnetic waves, or sound, etc.) detectable by sensors 112. Other sensors 112 may include seat pressure sensors 112 able to sense the presence of a weight on a seat, door ajar sensors able to recognize when a door is in a door ajar condition, i.e., less than a fully closed condition, and a door lock sensor able to determine both when a door lock is in a locked mode and when the door lock in in an unlocked mode. Thus, the vehicle 102, and people, as well as other items including as discussed below, fall within the definition of "object" herein. Additional example sensors 112 may also include steering sensors, drive motor sensors, brake sensors, wheel speed sensors, and battery sensors.

The vehicle communication module 118 allows the vehicle computer 110 to communicate with a remote computer (not shown) of the server 104 via, by way of example, a messaging or broadcast protocol such as Dedicated Short Range Communications (DSRC), Bluetooth® Low Energy (BLE), Ultra-Wideband (UWB), cellular, and/or other protocol that can support vehicle-to-vehicle, vehicle-to-structure, vehicle-to-cloud communications, or the like, and/or via the system network 106.

The vehicle computer 110 is a computing device that includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 102 operations including as described herein. Further, the vehicle computer 110 can be a generic computer with a processor and memory as described above and/or may include a dedicated electronic circuit including an ASIC (application-specific integrated circuit) that is manufactured for a particular operation, e.g., an ASIC for processing sensor 112 data and/or communicating the sensor 112 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may include or be communicatively coupled to, e.g., via the vehicle communication network 119 as may be provided by such as a communications bus as described further below, more than one processor, e.g., included in electronic controller units (ECUs) or the like included in the vehicle 102 for monitoring and/or controlling various vehicle components 116, e.g., a transmission controller, a brake controller, a steering controller, the heads-up display system, the far-infrared camera 108, etc. The vehicle computer 110 is generally arranged for communications on the vehicle communication network 119 that can include a bus in the vehicle 102 such as a controller area network (CAN) or the like, and/or other wired and/or wireless mechanisms.

Via the vehicle communication network 119, the vehicle computer 110 may transmit messages to various devices in the vehicle 102 and/or receive messages (e.g., CAN messages) from the various devices, e.g., the far-infrared camera 108, other sensors 112, actuators 114, ECUs, etc. Alternatively, or additionally, in cases where the vehicle computer 110 comprises a plurality of computing devices that may be associated with particular components and systems of the vehicle 102, the vehicle communication network 119 may be used for communications between the computing devices which may be represented as the vehicle computer 110 in this disclosure. Further, as mentioned below, various controllers and/or sensors 112 including the far-infrared camera 108 may provide data to the vehicle computer 110 via the vehicle communication network 119.

The vehicle computer 110 is programmed to receive data from one or more sensors 112, 108, e.g., substantially continuously, periodically, and/or when instructed by the remote computer of the server 104, etc. The data may, for example, include a location of the vehicle 102. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle, a sign, a tree, a person, etc., relative to the vehicle 102. As one example, the data may be image data of the environment around the vehicle 102. In such an example, the image data may include one or more objects and/or markings, e.g., lane markings, on or along a road. Image data herein means digital image data, i.e., comprising pixels 139, typically with intensity and color values, that can be acquired by visible light, i.e., RGB, cameras 112 and far-infrared cameras 108. To avoid doubt, pixels 139 are the smallest picture element of an image frame 138 or a digital display that can is addressable and can be manipulated in software. The sensors 112, 108 can be mounted to any suitable location in or on the vehicle 102, e.g., on a vehicle 102 bumper, on a vehicle 102 roof, etc., to collect images of the environment around the vehicle 102.

In addition, the vehicle computer 110 may be configured for communicating via the vehicle communication module 118 and the system network 106 with devices outside of the vehicle 102 using wireless communications (cellular and/or DSRC, etc.) or direct radio frequency communications. The communication module 118 could include one or more mechanisms, such as a transceiver, to facilitate such communication, and may employ any desired combination of wireless (e.g., cellular, wireless, satellite, microwave and radio frequency) communication mechanisms and any desired network topology (or topologies when a plurality of communication mechanisms are utilized). Exemplary communications provided via the communications module 118 include cellular, Bluetooth®, IEEE 802.11, Ultra-Wideband (UWB), Near Field Communication (NFC), dedicated short range communications (DSRC), and/or wide area networks (WAN), including the Internet, providing data communication services.

The remote server 104 can be a conventional computing device, i.e., including one or more processors and one or more memories, programmed to provide operations such as disclosed herein. Further, the remote server 104 can be accessed via the network 106, e.g., the Internet, a cellular network, and/or or some other wide area network, particular forms of which may be characterized as a cloud server 104.

The network 106 represents one or more mechanisms by which a vehicle computer 110 may communicate with remote computing devices, e.g., the remote computer of the server 104, a cell phone, another vehicle computer, etc. Accordingly, the network 106 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services).

Figure 2:
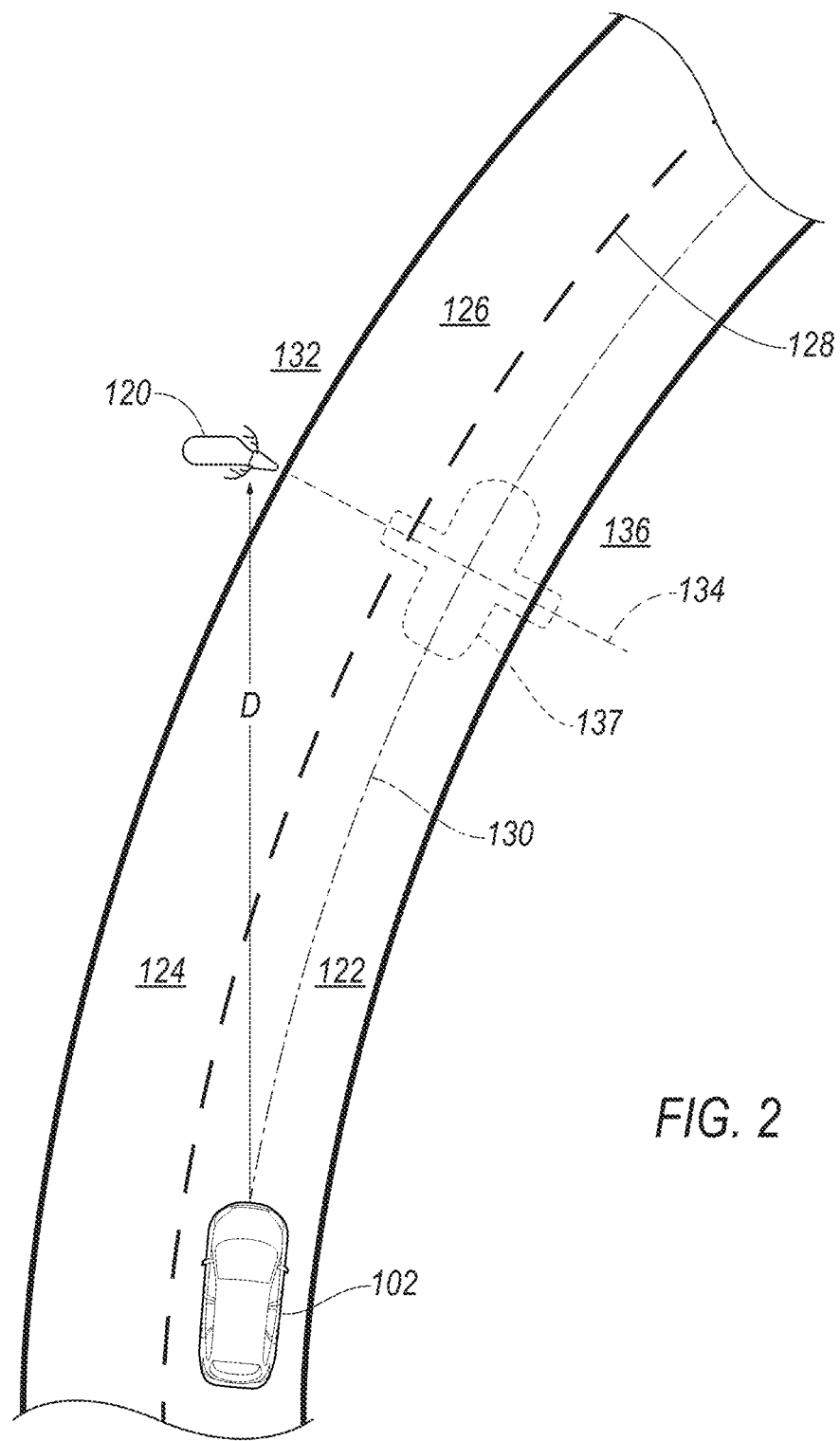
FIG. 2 is a plan view of an example scene of a vehicle on a road approaching a large animal.

FIG. 2 illustrates an example scene, showing a relative location of an animal 120 and the vehicle 102 from a plan-view perspective. The vehicle 102 is in a right lane 122 of a two-lane road 124, traveling toward a top of the page. The right lane 122 is separated from a left lane 126 by a dividing line 128. An example future vehicle trajectory 130, as may be generated by the computer 110, is shown as remaining substantially centered in the right lane 122. While the future vehicle trajectory 130 is illustrated as a line, the future vehicle trajectory 130 anticipates the movement of the entire space occupied by the vehicle 102 along the illustrated path of the future vehicle trajectory 130. The animal 120 is illustrated as being on a shoulder 132 of the left lane 126 of the road 124, separated from the vehicle 102 by a distance D. An example future animal trajectory 134, which may also be generated by the computer 110, is shown as crossing the road 124 to and beyond a shoulder 136 of the right lane 122 at a substantially normal angle. As with the future vehicle trajectory 130, the future animal trajectory 134 anticipates a movement of the entire animal 120 occupying the actual space occupied by the animal 120, and not just the illustrated line 128. An intersection of the future animal trajectory 134 and the future vehicle trajectory 130 may accordingly occur anywhere that contact of the vehicle 102 with the animal 120 may occur. Such an intersection may occur within an intersection envelope 137 that accounts for the shapes and sizes of the vehicle 102 and the animal 120. The intersection envelope 137 may be sized to account for possible variations in the future trajectories 130, 134. The intersection may occur at any time that any portion of both the animal and the vehicle are in the envelope 137.

Figure 3A:
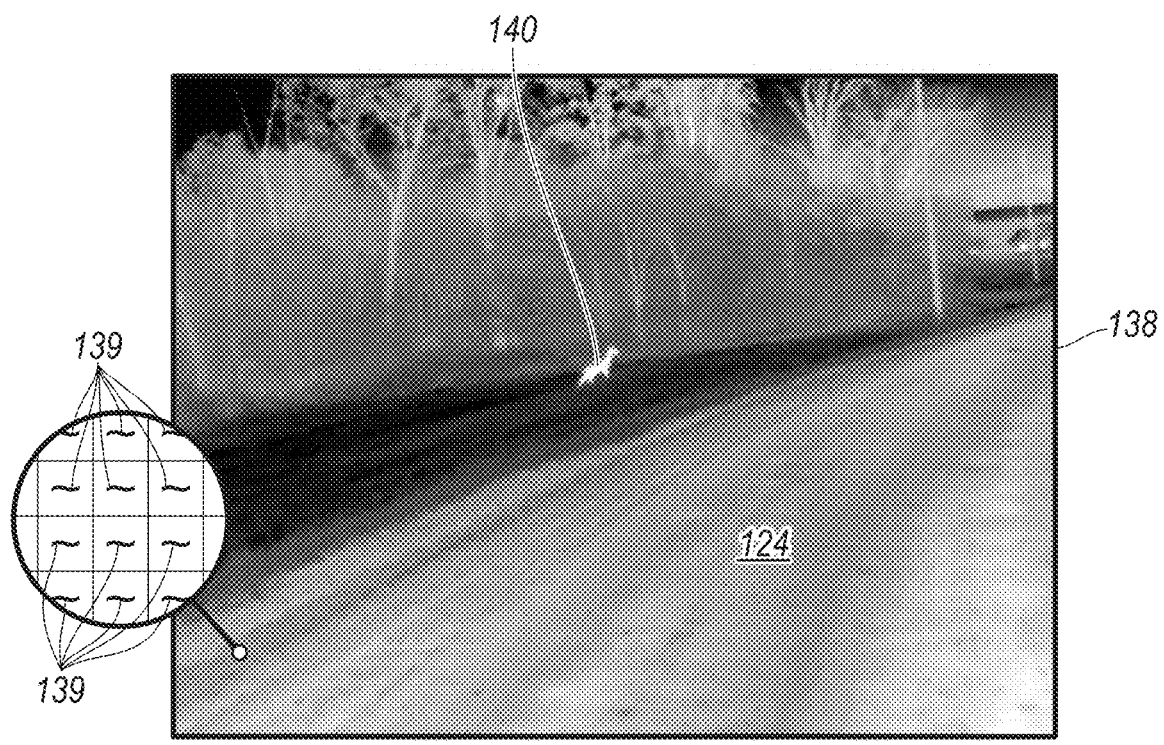
FIG. 3A is a representative far-infrared image frame as generated by an example far-infrared camera.
Figure 3B:
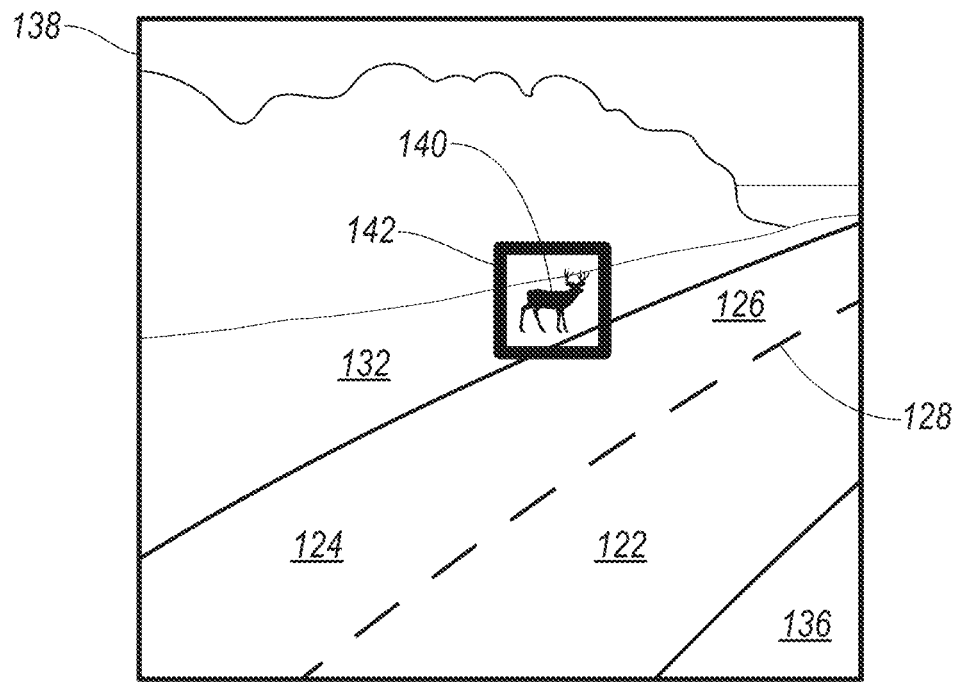
FIG. 3B is an illustrated rendering of an example image frame like that of FIG. 3A.

The far-infrared camera 108 generates image frames 138 comprising a plurality of pixels 139. The image frames are generated in a sequence analogous to the generation of movie frames of a film medium. An example image frame 138 of such a sequence is shown in FIGS. 3A and 3B. FIG. 3A is a digital image as generated by the camera 108, providing the example image frame 138 and context as generated by the camera 108, illustrating that an animal image 140 appears brighter than its surroundings, as it is giving off more heat than other elements in its surroundings. FIG. 3B is an illustrated rendering of the example image frame 138 of FIG. 3A. FIG. 3B allows for a more discernable layout of an example context in which the image 140 of the animal 120 is located.

The camera 108 generates a plurality of frames 138 at a predetermined rate, one example rate being 30 frames 138 per second. Example alternative rates include 90 frames per second, 60 frames per second, and 8 frames per second. When there is movement of an object, such as the animal 120 relative to the camera 108, pixels 139 comprising the image of the object, such as the animal image 140, will appear to move as between the frames 138. It is appreciated that the pixels 139 do not move, but the pixels 139 selected to be illuminated or otherwise energized to define the animal image will be changed from frame to frame as the animal moves. This results in an illusion of pixel movement. The term pixel motion, or alternatively, pixel-level motion, is used herein to describe the changing selection of pixels 139 to represent motion of objects in a plurality of sequential image frames 138. The computer 110 is, as will be discussed in more detail below, programmed to detect the image 140 of the animal 120 in the image frames 138. The image 140 is generated by the far-infrared camera 108 when the animal 120 is within a range of the camera 108. An example range of the far-infrared camera 108 is 1000 meters. Depending on circumstances such as the weather, and impediments such as foliage or lack thereof, the range may be shorter or longer. Image frames 138 provided by the far-infrared camera 108 are processed substantially simultaneously with their generation to detect warm-blooded animals.

When the animal image 140, and thus the animal 120, is detected, the computer 110 characterizes the animal image as either being an image of a predetermined large animal that the computer is trained to recognize (e.g., deer, elk, horse, cow, bear) or not such a predetermined large animal. Animals not recognized as large animals, for example, small animals (e.g., squirrels, rabbits, skunks, etc.) do not have their images given additional consideration.

When the animal image 140 is an image of a predetermined large animal (e.g., deer, elk, horse, cow, bear) that the system 100 is trained to recognize the computer 110 generates a bounding box 142 that bounds the animal image 140. The bounding box 142 may be supplemented by an annotation (not shown) that may include supplemental information such as an indication of distance. As with pixel motion, a position of the bounding box 142 may move within the image frame 138 relative to its position in an earlier or later image frame 138, suggesting movement of the bounding box 142, i.e., bounding box movement. Relatedly, as the animal image 140 becomes larger or smaller relative to image frame 138 with, respectively, decreases or increases in distance between the animal 120 and the camera 108, the associated bounding box 142 will likewise become larger or smaller, i.e., increase or decrease in magnitude.

Animals 120 that are characterized as being a large animal are subsequently classified into a plurality of classifications. The plurality of classifications includes classification as a tracked animal or a non-tracked animal. Large animals, such as deer, subject to consideration of additional criteria, may be classified as tracked animals. Large animals that have a past trajectory in a direction away from a predicted vehicle trajectory, for example, a deer that is unambiguously moving away from the road (e.g., at a 90 degree angle to the dividing line 128); or a deer that is posed/oriented to face a direction unambiguously away from the road (e.g., at a 90 degree angle to the dividing line 128), may also be classified as non-tracked animals. Large animals may otherwise be classified as tracked animals.

Figure 4:
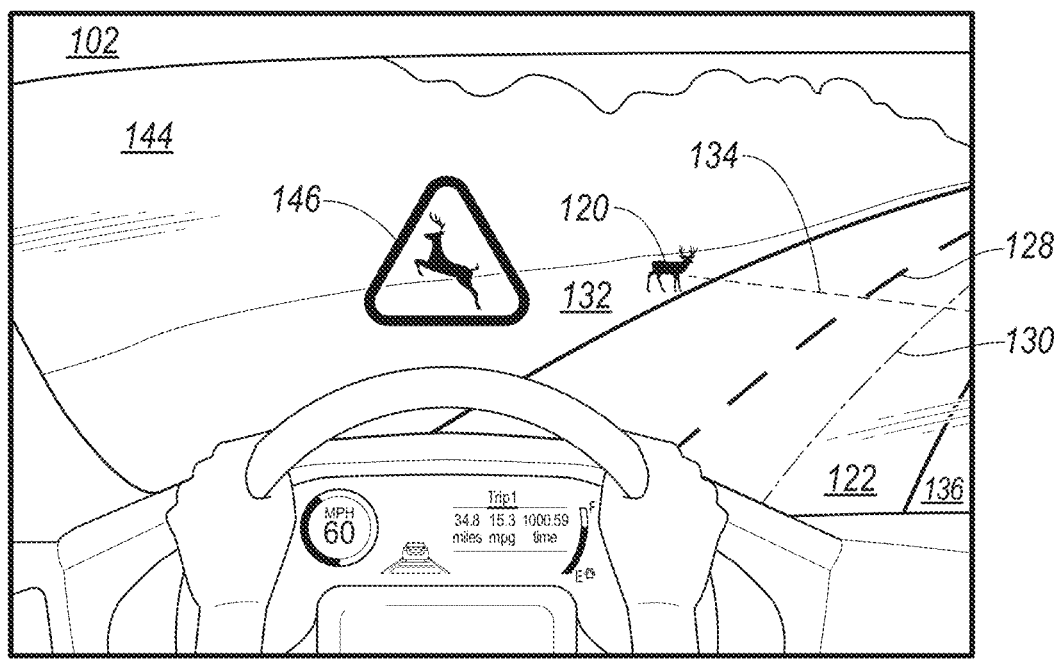
FIG. 4 is an example view through an example vehicle windshield from a vehicle operator's perspective.

FIG. 4 shows an example view of the example scene of FIG. 2 through the vehicle's 102 front windshield 144 from a vehicle operator's perspective. The animal 120, which may not be visible to the vehicle operator's unassisted eyes, is shown on the left lane shoulder 132 of the road 124. When the future trajectory 134 of the animal 120 and the future trajectory 130 of the vehicle 102 intersect, the computer 110 initiates an intervention. An example intervention illustrated in FIG. 4 is a display to the vehicle operator of a visual notification in the form of an intervention icon 146, by way of example, a leaping deer surrounded by a triangle, projected into a field of view of the vehicle operator. The heads-up display system 116, one of the components 116, is one way of providing such an intervention icon 146. An augmented reality system (not shown) is an alternative approach to displaying an intervention icon 146. The heads-up display system 116 may use the windshield 144 as its display screen, projecting the icon 146 onto the windshield 144, Upon perceiving such an intervention icon 146, the vehicle operator may be able to timely slow or otherwise maneuver the vehicle 102 to avoid the animal 120.

Figure 5:
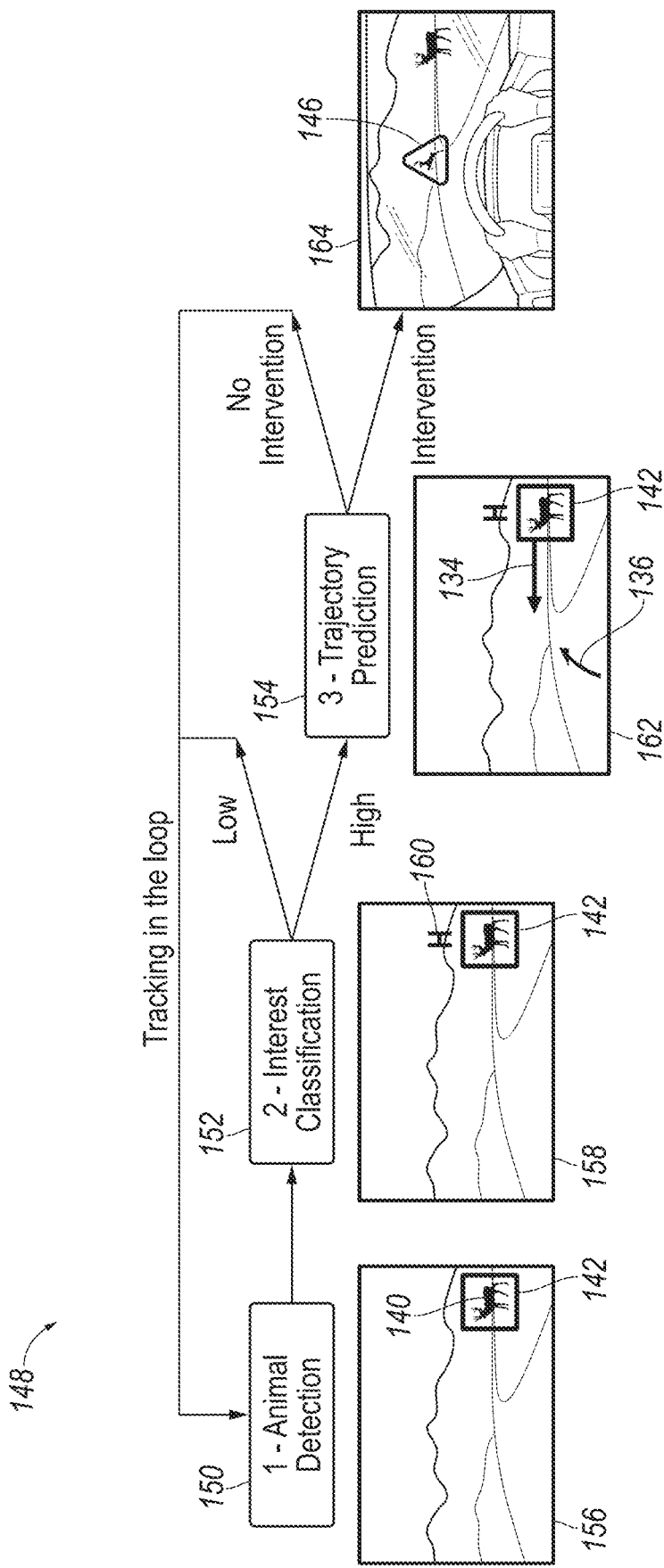
FIG. 5 is an example process flow of an example large animal intervention system.

FIG. 5 illustrates an example process flow 148 of the example large animal intervention system 100. The illustrated example process flow 148 of the large animal intervention system 100 provides a tracking system loop for continued detection, tracking, and trajectory prediction. The process flow 148 makes the system 100 more robust with regard to addressing occlusion of the animal 120, should such occlusion occur. The example process flow 148 operates in a loop, and the process flow may be characterized as the tracking system loop 148. The example process flow 148, includes, by way of example and to facilitate its description, three principal stages: a first stage, i.e., an animal detection stage 150, a second stage, i.e., an interest classification stage 152, and a third stage, i.e., a trajectory prediction stage 154. The first and second stages 150 and 152 may be combined. The example interest classification stage 152 has two alternative outputs: High, in which case the process continues to the trajectory prediction stage 154, and low, in which case the process 148 loops back to the animal detection stage 150 and continues on. When the interest classification is high, the animal image 140 may be classified as a tracked animal, and when the interest classification is low, the animal image 140 may be classified as a non-tracked animal. The example trajectory prediction stage 154 also has two alternative outputs: intervention, and no intervention. In the case of no intervention, the process 148 loops back to the animal detection stage 150 and continues on. In the case of intervention, the process 148 intervenes with the vehicle operator, and an example intervention being the visual notification described in the description of FIG. 4.

FIG. 5 also shows an example distinct image frame, similar to the image frame 138, for each of the stages 150, 152, 154. An example animal detection image frame 156, for the animal detection stage 150, includes the animal image 140 and the bounding box 142. An example interest classification image frame 158, for the interest classification stage 152, includes the elements of the animal detection image frame 156 and additionally includes an example classification annotation 160 associated with the bounding box 142. If the first and second stages 150 and 152 are combined, the classification image frame 158 may be generated without the generation of the animal detection image frame 156. An example trajectory prediction image frame 162, or an output frame 162, for the trajectory prediction stage 154, includes the elements of the interest classification image frame 158 and additionally may include the future animal trajectory 134 and the future vehicle trajectory 130. The intervention decision is supplemented by an intervention image 164 much like FIG. 4, illustrating the issuance of the intervention icon 146 as an example intervention. The image frames 156, 158, 162 of the sequence of image frames may each include a plurality of animal images and bounding boxes, as the system 100 is able to process multiple animal images substantially simultaneously. Only one animal image 140 is shown in each image frame to facilitate a clear description of the system 100 and its operation. Each of the example stages 150, 152, 154, as well as the alternative outputs, will be discussed in more detail below.

The image frames 138 are processed to assess the animal type and size, and to assign a bounding box 142 to the animal image.

Figure 6:
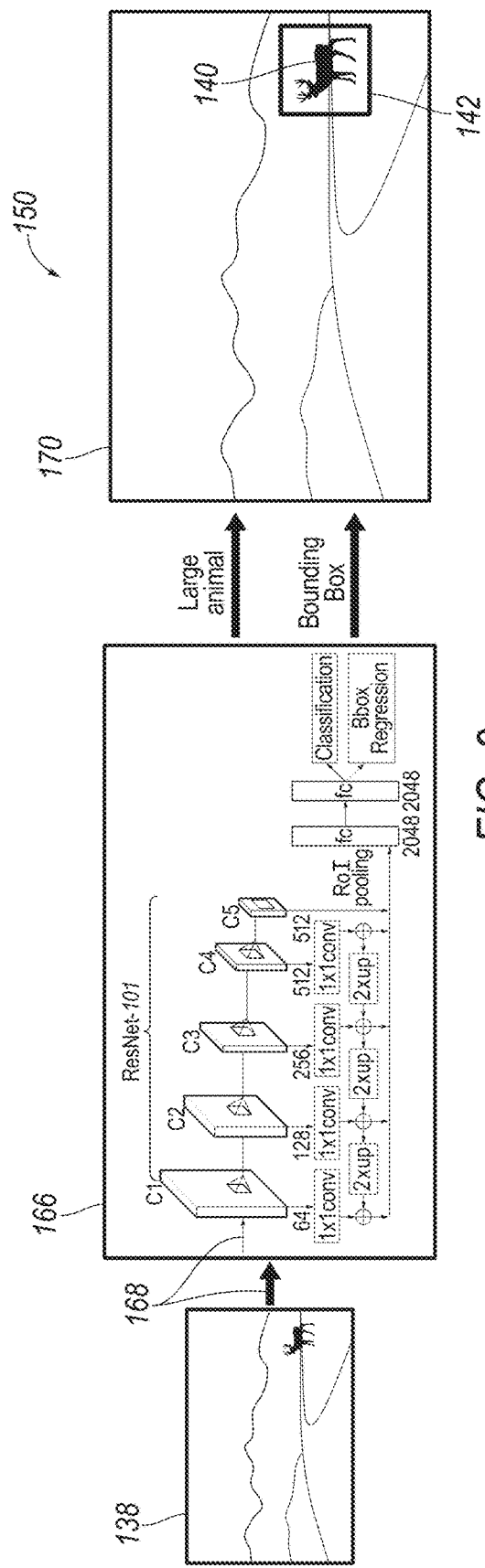
FIG. 6 is a schematic illustration of an example animal detection stage process flow.

As illustrated in FIG. 6, the animal detection stage 150 employs an FIR-based large animal detection model 166. The model 166 is trained to detect all visible animals in the range of the far-infrared camera 108. To train the detection model 166, FIR image sequences are collected and annotated with a bounding box around each deer and a label, i.e., annotation, an example annotations being "Deer" or "Large Animal." The animal detection model 166 is based on adaptive thresholding and deep learning, and is trained using the infrared images. While deer images may be used to train the example model 166, images of other animals, such as moose, elk, bears, and others, could be included in such training to allow the identification of a variety of large animals. Additionally, pixel intensity, i.e., with respect to the example of FIG. 3A, pixel brightness, may be used as an indicator of a temperature of an identified thermal field. The animal image 140 as shown in FIG. 3A illustrates that the animal image 140 is distinguished by its brightness or intensity.

As an increase in a distance from the vehicle 102 to the animal 120 results in a decrease in the pixel intensity captured by the far-infrared camera 108 for a given animal, it is possible to generate a first estimated distance of the true distance D to the animal based on pixel intensity for the image frame 138. This method can be used to greater effect when the type of animal to which the distance D is being estimated has been identified. For example, if the expected body temperature of a deer at close quarters is known to be a particular value, such as 40 degrees Celsius, the model 166 may be trained to estimate the true distance D based on that temperature and an anticipated rate of temperature decrease with an increase in distance D. A size of the bounding box 142 may also be used in generating a second estimated distance of the true distance D to the animal for the image frame 138. The model 166 can be trained to generate the second estimated distance for the image frame based on the bounding box size. The use of the bounding box size to estimate distance to, for example, a deer, depends on the use of a predetermined representative deer size. In the present example, the example deer size used was 1.5 meters by 1 meter. An example application to a deer at a distance D of one meter may result in the animal image occupying 150 pixels by 100 pixel of the image frame 138. Distance estimates may be scaled accordingly. The changes in the pixel intensity and the bounding box size may be used to generate the estimated distances from the camera, and thus the vehicle, to the animal. The estimated distances are established as an element of the interest classification stage 152. The estimated distances are generated prior to the classification of the animal 120 as being either a tracked animal or a non-tracked animal. The annotations of the example image frame 158 may include an identification of the animal 120 of the animal image, e.g., deer, and an estimate of the distance D, e.g., 100 meters. The model 166 may also be trained to estimate the distance D by generating an estimate based on both the pixel intensity of the animal image 140 and on the size of the bounding box 142. The pixel intensity estimate of the distance and the bounding box estimate of the distance for an image frame 138 would each be individually weighted to generate the estimated distance. The respective weights would be based on the training images.

The computer 110 is programmed to support a convolutional neural network that is used to process the image frame 138 for the combination of stages 150 and 152. The large animal detection model 166 is presented as a region-based convolutional neural network ("R-CNN") model 166 in FIG. 6, and has elements comprising a Residual Network (ResNet), and more particularly a ResNet-101 R-CNN model 166. The example R-CNN model 166 is a two-stage process: a first stage detects a region of interest ("ROI"); the second stage us used to classify images 120 as being a large animal (e.g., deer) or not also for assigning bounding boxes and annotations. The example ResNet-101 R-CNN model 166 facilitates fast detections and classifications. Ideally, a processing speed of the model 166 is sufficient to allow the model 166 to process the image frames 138 at the speed at which they are being generated, the present example being 30 image frames per second. A first arrow 168 represents the input of the image frame 138 into the R-CNN model 166. A detection output image frame 170 including the bounding box 142 and the animal image 140 can be generated by the model 166. While the example model 166 is an R-CNN model, alternatives include single stage detectors such as You Only Look Once ("YOLO") and Single Shot multibox Detector ("SSD") systems.

The example ResNet-101 R-CNN model 166 includes five convolutional blocks, labeled C1, C2, C3, C4, and C5. The ResNet-101 R-CNN model 166 may be characterized as comprising 101 layers deep, distributed between the blocks C1-C5. A quantity of filters varies with the blocks, from 64 for block C1, to 128 for block C2, to 256 for block C3, to 512 for block C4, and then remaining at 512 for block C5. The output is pooled. A Region of Interest ("RoI") pooling yields first and second fully connected ("fc") layers. The model 166 identifies the animal 120 as being a large animal or not a large animal and can be used to generate the bounding box 142 as shown in the example detection output image frame 170 FIG. 6. As also noted later in this description, the example R-CNN model 166 was trained to recognize white tail deer as an example large animal, using 26,127 far-infrared images of white tail deer and 77,291 bounding boxes with annotations, i.e., annotated bounding boxes. Annotations may include such information such as that the animal image 140 is recognized as a deer image, and the estimated distance for distance D, for the image frame 138. Examples of how to train a R-CNN model to recognize particular animals are available.

The interest classification stage 152, whether separate or integrated with stage 150, considers certain inputs which results in a decision to classify the identified large animal 120 as being one of high interest, i.e., a tracked animal or low interest, i.e., a non-tracked animal. Classification inputs may include the image 140 in the bounding box 142 and the whole image of the image frame 138, providing global context, and all annotations.

Figure 7:
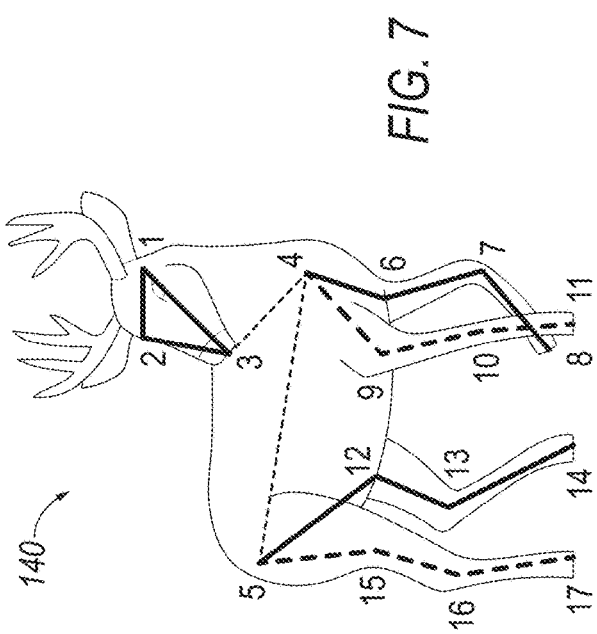
FIG. 7 is an image of an example deer including example key points of the deer.

The classification inputs may optionally include a pose of the example animal 120, a deer, as shown in FIG. 7. The pose may be defined by coordinates of key points of the animal image 140 as described in more detail below. The term "key points" is used consistent with its use in the field of pose estimation, and is not intended to be limiting beyond its use as an identifying name. Only the animal images 140 classified as having a high level of interest and accordingly classified as a tracked animal will be used for the next stage 154, which is trajectory prediction and impingement probability estimation. The pose may also be defined separately by a separately trained R-CNN model (not shown).

FIG. 7 is an image of a deer, an example large animal 120. The illustrated deer 120 includes a plurality of key points labeled 1 through 17. The key points are associated with discrete features of the animal, including by way of example, a nose 3, eyes 1,2, ears (not used in the present example), limb joints 4, 6, 7, 9, 10, 5, 12, 13, 15, 16, and limb terminal points 8, 11, 14, 17. The model 166 and/or the model used for classification may be trained to identify the key points 1-17 of the deer image 140 and their respective locations in the image frame 138. Connecting the key points with line segments as illustrated in FIG. 7 defines a crude skeleton of the animal image 140. The locations of the key points 1-17 relative to each other and relative to contextual elements of the image frame 138 such as the road 124 define a pose of the animal 120.

If not integrated with the detection stage 150, the classification stage 152 may be performed with a classification model similar to the detection model 166. The classification model may be trained to determine an interest level for each large animal image, selecting only high-interest animal images for processing at the next stage 154. Filtering the animal images 140 in this way increases the accuracy of the interest classification stage 152 and reduces the computational cost, as only the images 140 of greatest interest are processed for trajectory predictions, and images of low interest, e.g., where the animal 120 is very far from the vehicle, is far from the road, in a pose inconsistent with crossing the road, are not processed for prediction purposes.

Once an animal image 140 is classified as a tracked animal, a trajectory prediction is generated. Based on the trajectory prediction, a determination of intersection or no intersection is made. When a determination of intersection is made, an intervention is initiated. One example intervention is actuating a component, e.g., the heads-up display 116, to provide a vehicle operator with a notification. The notification may be a visual notification, as illustrated by the example intervention icon 146 of FIG. 4 projected by the heads-up display system 116 onto the windshield 144.

Figure 8:
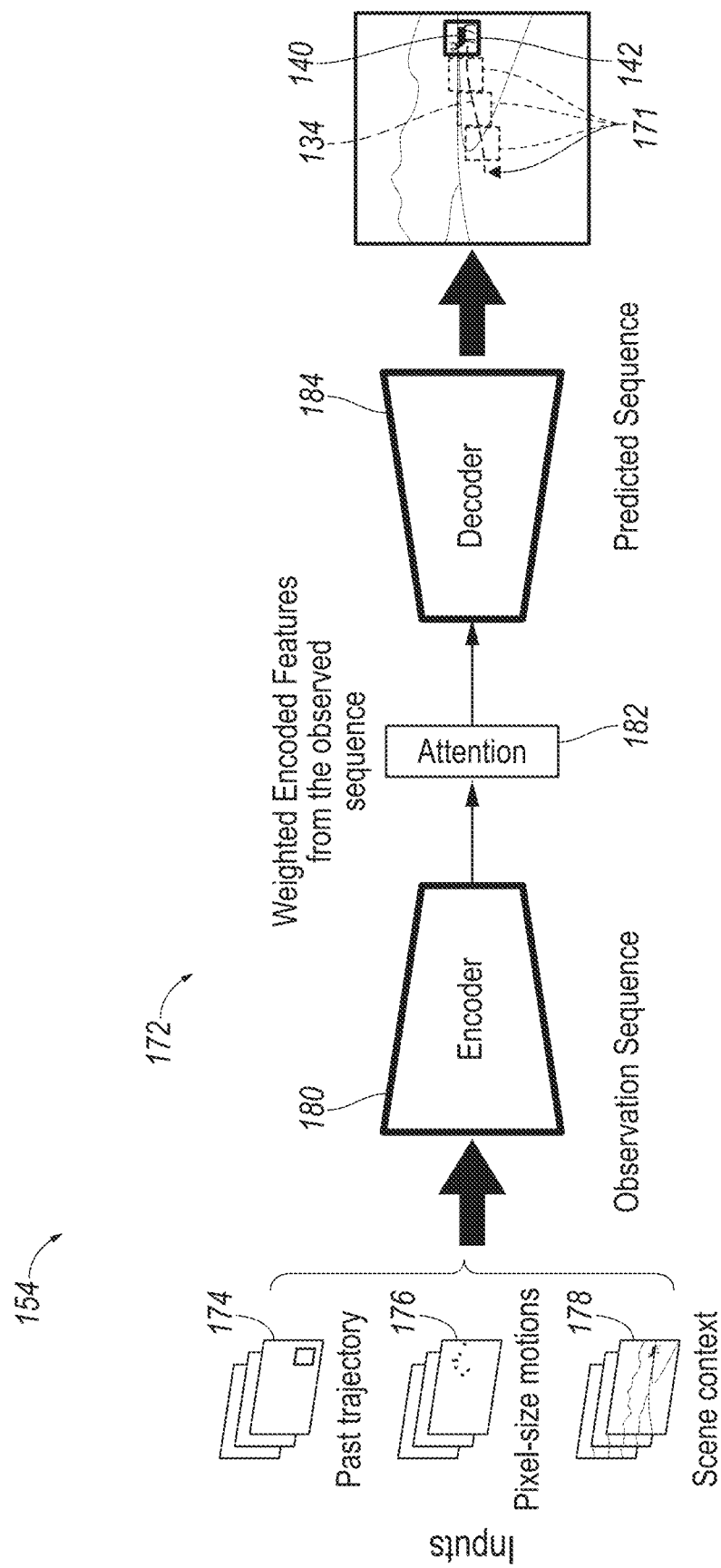
FIG. 8 is a schematic illustration of an example animal trajectory prediction neural network model.
Figure 9:
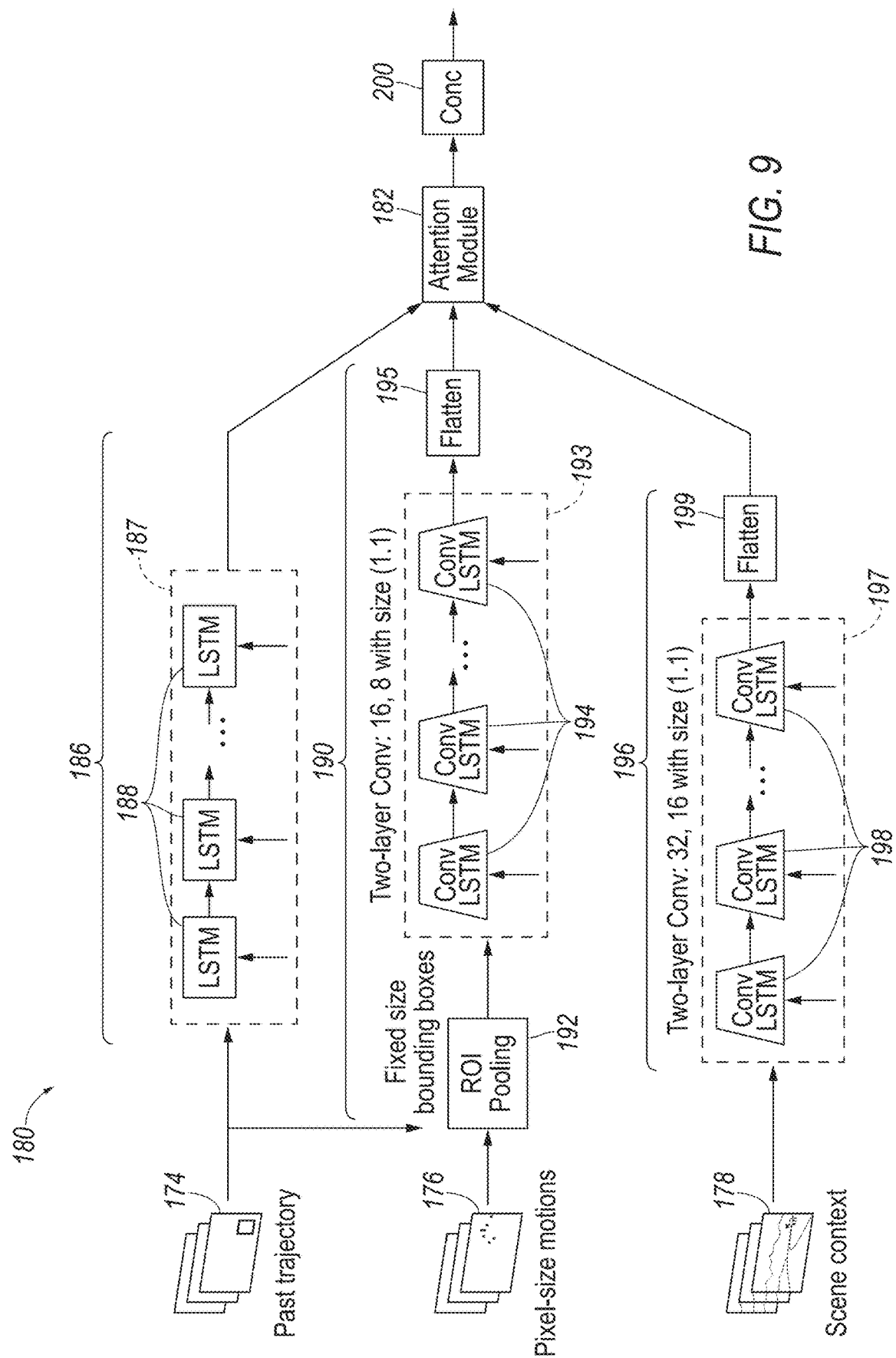
FIG. 9 is a schematic illustration of an example encoder of the example neural network of FIG. 8.
Figure 10:
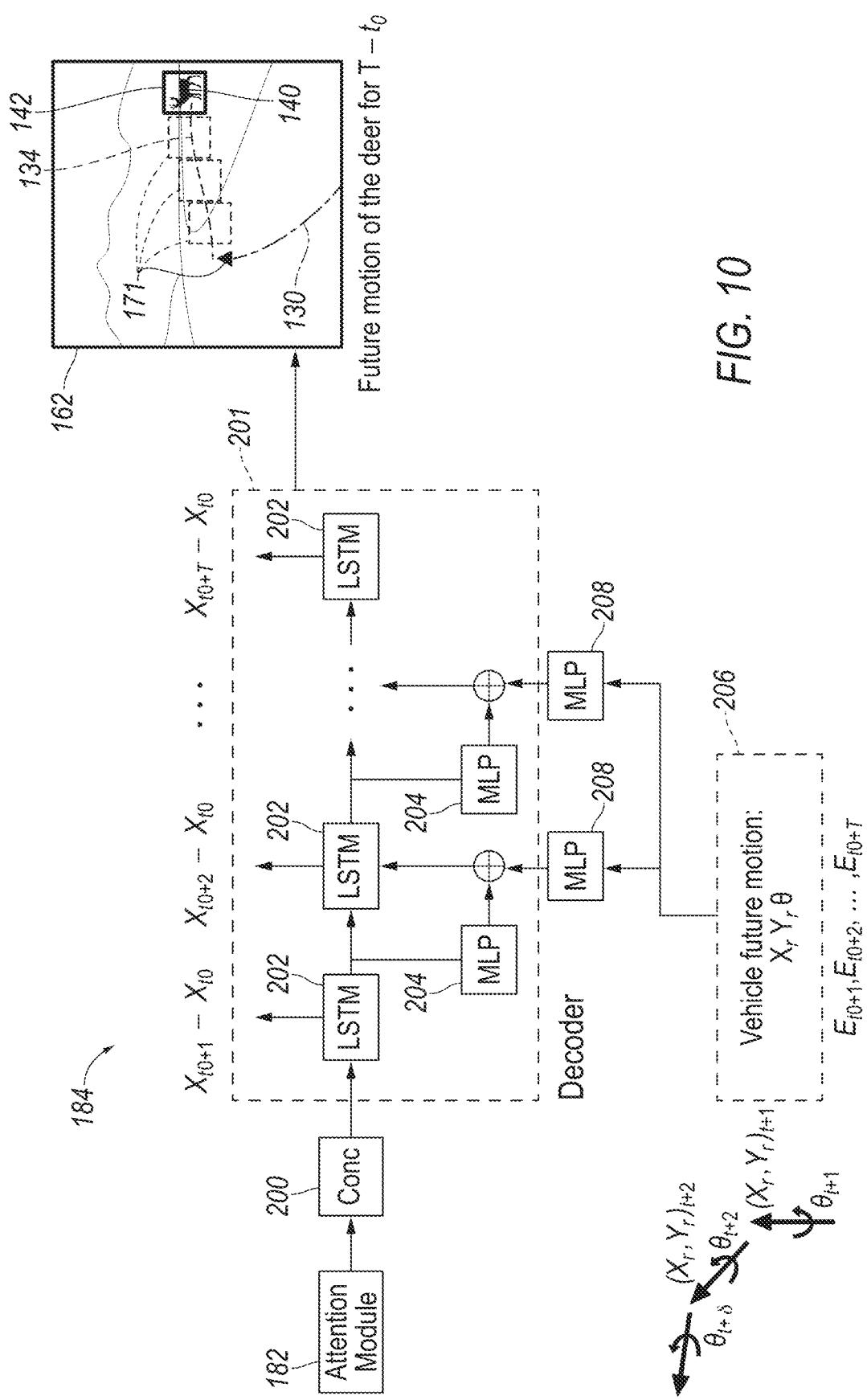
FIG. 10 is a schematic illustration of an example decoder of the example neural network of FIG. 8.

The trajectory prediction stage 154, illustrated in FIG. 8, models, i.e., generates predictions of, the animal future trajectory 134 and an animal future location 171 to determine the possibility of any future collision/impingement between the tracked animal 120 and the vehicle 102. An example animal trajectory prediction neural network model 172, such as a convolutional long short term memory ("Conv-LSTM") attention-based multi-stream encoder-decoder model 172, is used to predict the animal future trajectory 134 and the animal future location 171. The encoder-decoder model 172 models the animal future trajectory 134 and the animal future location 171 based on a sequence of past far-infrared video observations of the animal 120. An example architecture of the model 172 is shown in FIGS. 8, 9, and 10. The model 172 is memory-based and preserves both temporal and spatial information. The example model 172 may be configured to require only two seconds of observation time to make predictions of the animal's trajectory and location. Thus, the model 172 can make predictions within two seconds of detecting any new animal in a field of view of the far-infrared camera 108. The trajectory prediction model 172 is designed to benefit from multiple input streams in order to maximize its observation domain.

Three example input streams to the model are a past trajectory stream 174, a pixel-level motion stream 176, and a scene context stream 178. The encoder-decoder model 172 includes an encoder 180, an attention module 182, and a decoder 184. The model 172 is able to adaptively select features from the multiple input streams 174, 176, 178 thanks to its attention-based architecture. The use of Conv-LSTM blocks 194, 198 for the pixel-level motion stream 176 and the scene context stream 178, rather than regular RNN or LSTM blocks, aids in enhancing the predictions. The model 172 is able to observe the motion history as well as the local and global scene contexts. The local context is the image and pixel level motion inside of each bounding box. The global context is the whole image, including all of its content.

The encoder 180 of the model 172 is illustrated in FIG. 9. Management of the example streams 174, 176, 178 by the encoder 180 is discussed below on a stream-specific basis.

The first input stream 174 i.e., the past trajectory stream 174, is the two-dimensional location of the detected bounding boxes from the previous two-second observation (60 frames) of the sequence of image frames 138, i.e., past bounding box movement, which provides information about the animal's 120 motion history in the past. The past trajectory stream 174 also provides valuable information about the animal's average velocity and heading in the past. The past trajectory stream 174 goes through a first branch 186 of the encoder 180 comprising an LSTM unit 187 comprising a plurality of LSTM blocks 188. The first branch 186 generates an encoded first one-dimensional context vector from the past trajectory stream 174.

The second input stream 176 is the pixel-level motion stream 176. The pixel-level motion stream 176 includes data for past pixel motion based on the same sequence of images used for the first input stream 174. Dense optical flow is used for the pixels 139 inside each image frame 138 which provides precise information about the motion of each pixel 139 with respect to the background. The second input stream 176 provides the prediction model 172 with information about the pixel-level movements of the entire image frame 138 including pixel-level motion of the animal image 140. The second input stream 176 goes through a second branch 190 of the encoder 180. The second branch 190 comprises a regions of interest ("ROI") pooling layer 192, a Conv-LSTM unit 193 in turn comprising a plurality of Conv-LSTM blocks 194, and a flatten layer 195. The pixel-level motion stream 176 first goes through the ROI pooling layer 192, then the Conv-LSTM unit 193, and then the flatten layer 195. The flatten layer transforms the processed pixel-level motion stream 176 into a second one dimensional context vector.

The third input to the model 172 is the scene context stream 178 which provides valuable information about the scene, such as proximity of the animal 120 to one or more of the road elements 122, 124, 126, 128, road curves, etc. Due to likely but unpredictable motions and sudden movements by the animal 120, it is not possible to rely only on the animal's motion history to predict its future trajectory and location. Therefore, the scene is also searched for features that might prevent the animal 120 from crossing the road 124. This is inspired by the human brain's prediction mechanism, where both high-level and low-level changes in the scene are used to make a prediction. The third input stream 178 goes through a third branch 196 of the encoder 180. The third branch comprises a Conv-LSTM unit 197 in turn comprising a plurality of Conv-LSTM blocks 198, and a flatten layer. The scene context stream 178 first goes through the Conv-LSTM unit 197, and then through the flatten layer 199, to encode the whole scene which is used as a global context. The flatten layer 199 transforms the processed scene context stream 178 into a third one dimensional context vector.

The resulting vectors of each branch 186, 190, 196, derived from, respectively, the past trajectory of the tracked animal, the scene context, and the pixel motion, are fed into the attention module 182. The attention module 182, receiving the vectors from the encoder, performs adaptive multimodal fusion. The attention module 182 adaptively selects from among the outputs of the branches 186, 190, 196 based on the task at hand.

During the training of the encoder-decoder model 172, the attention module 182 learns to assign a weight to each input vector in an adaptive way, depending on how relevant each vector is to the given situation. For example, when a deer 120 is not moving, is a short distance (e.g., 20 meters) from the vehicle 102, and is stationary in the right lane 122, the same lane as the vehicle 102, the attention module 182 gives more attention (i.e., greater weight) to the global context vector than to the past trajectory or pixel motion vectors. Attention weights are thus assigned by the attention module 182. Additionally, input space ablation is performed to remove irrelevant features. A resultant attention vector thus includes optimally encoded features from the observed infrared sequence as provided by the branches 186, 190, 196. The encoded features from the observed infrared sequence then go from the attention module 182 into the decoder 184. The decoder 184 is an LSTM-based decoder 184, shown in more detail in FIG. 10. The output of the decoder 184 is the predicted future trajectory 134 of the large animal 120.

The output vectors of the encoder 180 are augmented by the attention module 182 which may be provided by a temporal attention-fusion mechanism incorporated by the attention module 182. The augmentation includes weighting the vectors as described below.

The attention computation performed by the attention module 182 happens at every decoder time step which may be synchronized with the image frame rate (e.g., 30 frames per second). The computation includes the following three stages. In a first stage, a current target hidden state $h_t$ in the decoder 184 is compared with all source states $h_s$ in the encoder 180 to derive attention weights with an equation for the attention weights being:

$$\alpha_{ts} = \frac{\exp(\cosine[h_t, h_s])}{\sum_{s'=1}^{S} \exp(\cosine[h_t, h_{s'}])}.$$

In a second stage, based on attention weights, a context vector is computed as a weighted average of based on the attention weights, with the context vector having the equation: $C_t = \Sigma_s \alpha_{ts} h_s$. In a third stage, the context vector is combined with the target hidden state to yield the final attention vector. The final attention vector can be expressed by the equation: Attention$_t$=Relu($W_c$[$\Sigma_s \alpha_{ts} h_s$; $h_t$]), where $W_c$ values are learnable weights, and Relu is the Rectified Linear Units. The attention vector is fed as an input to the next time step. This corresponds to feeding in a softα weighted context into the system. The whole model 172 is smooth and differentiable under the deterministic attention, so learning end-to-end can be achieved by using standard back-propagation.

The output of the attention module is concatenated to provide a single one dimensional attention vector. The concatenation function may be performed by either the attention module 182, or by a separate concatenation module 200 as may be provided by a MultiLayer Perceptron ("MLP") block.

As noted, input to the decoder 184, i.e., the attention vector, is provided by the attention module 182 in the form of attention-based encoded features from the observed sequence of image frames. The decoder 184 includes a decoder LSTM unit 201, comprising a plurality of decoder LSTM blocks 202. For the trajectory prediction by the encoder-decoder model 172, consistent with the examples of FIG. 9 and FIG. 10, two stacks of 60 Vanilla LSTM blocks are employed for each of the encoder 180 and the decoder 184. The LSTM unit 201 enables the decoder to accurately predict the future location of the deer based on the encoded features from the observed sequence. The decoder LSTM unit 201 also includes a plurality of decoder MLP blocks 204. The illustrative trajectory prediction image frame 162 shows example predicted future animal positions 171, animal trajectory 134, and vehicle trajectory 130.

Since the camera 108 is on-board the vehicle 102 and moves in unison therewith, a vehicle state (location, heading) should be considered to compensate for the relative motion between the animal 120 and the vehicle 102. Future vehicle motion may be defined by variables X, Y, and $\theta$. The relative movement of the vehicle/camera relative to the animal is critical, as the vehicle, and thus the camera, are not stationary. The compensation can be provided using a Simultaneous Location and Mapping ("SLAM") based motion prediction module 206. The SLAM-based motion prediction module 206 addresses the motions of the camera 108 with the vehicle 102. Compensation for the relative motion of the vehicle with respect to the animal is thus provided. One or more connecting MLPs 208 may be disposed between the motion prediction module 206 and the decoder LSTM unit 201 of the 184 decoder. FIG. 10 shows symbols indicating predicted vehicle trajectory with variables X, Y and $\theta$.

With more particularity regarding the SLAM-based motion prediction module 206, ORB-SLAM may be used to estimate the vehicle motion history from first-person view images. ORB-SLAM facilitates visual odometry used to estimate a change in position of the vehicle 102.

The decoder 184 uses both the context stream 178 from the past observation and the vehicle's 102 future trajectory 130 as inputs to make predictions about the future trajectory 134 of the large animal 120. In order to make the prediction model 172 more robust against sudden changes in the animal crossing behavior, the entire process of detection, interest classification, and trajectory prediction can be continuously repeated in a loop.

Figure 11:
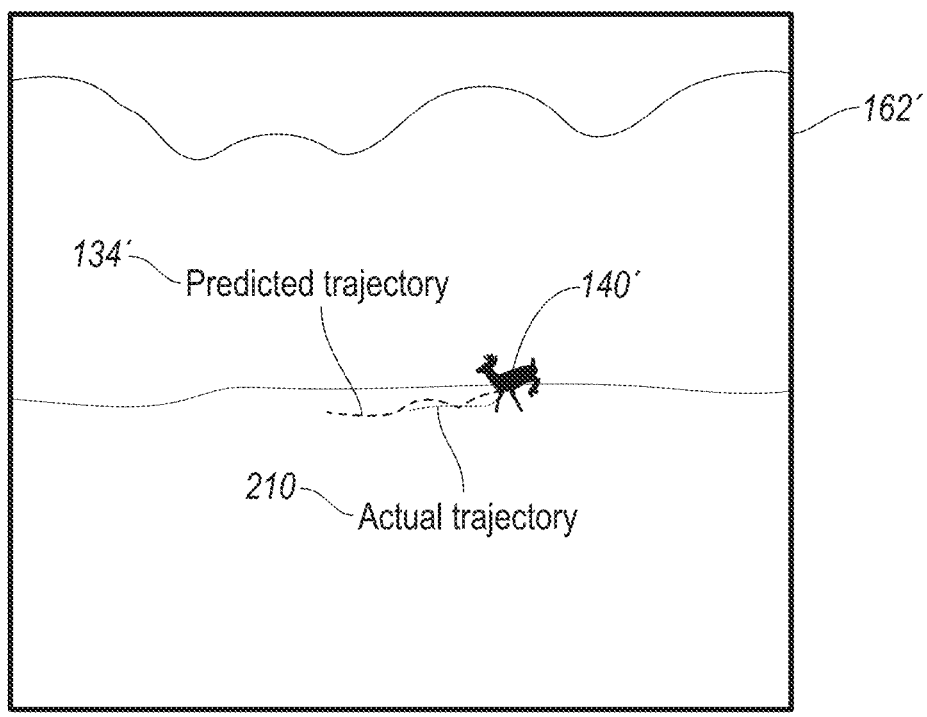
FIG. 11 is an illustration of an example trajectory of a deer as predicted by the example neural network of FIG. 8, compared with an example actual trajectory of the deer.

FIG. 11 shows a second illustrative trajectory prediction image frame 162' comparing a predicted future animal trajectory 134' with the subsequent actual animal trajectory 210. The trajectories 134', 210 are shown relative to a location of the animal 120, represented by an animal image 140', at a time of a prediction of the animal trajectory.

Figure 12:
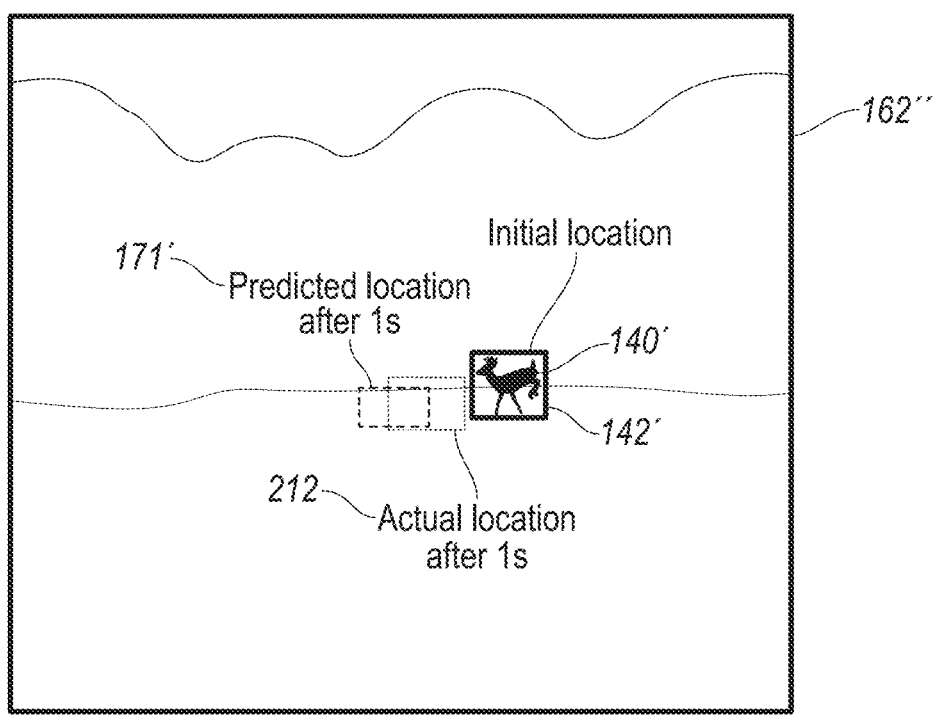
FIG. 12 is an illustration of an example deer image surrounded by a first bounding box at a first location, an example predicted future location bounding box and an example actual future location bounding box.

FIG. 12 is supplemental to FIG. 11. FIG. 12 shows a third illustrative trajectory prediction image frame 162" comparing a predicted future animal location 171' with the subsequent actual animal location 212. The locations 171', 212 are shown relative to a location of the animal 120, represented by an animal image 140' and a bounding box 142', at a time of a prediction of the animal trajectory. The predicted future animal location 171' is the location predicted for a time of one second from the time of prediction. The subsequent actual animal location 212 is the actual location of the animal 120 one second after the time of prediction.

The experiment that generated the comparisons of FIGS. 11 and 12 is described below.

The model was trained in an end-to-end fashion using a mean squared error ("Lmse") loss function. Lmse is calculated by picking the top 5 trajectories closest to the ground truth from a sample of 10 future trajectories.

Training data for the example large animal intervention system 100, including the large animal detection model 166 and the encoder-decoder model 172, was collected in rural areas of Michigan in real nighttime driving scenarios. A FUR Boson camera having 50 degrees horizontal field of view was used for data collection. The images have video graphics array ("VGA") with a resolution of 640×480 pixels 139, yielding 307,200 pixels 139 in the image frame 138 such as shown in FIG. 3A, and a collection rate of 30 frames collected per second. Each deer image 140 in the dataset is annotated with a bounding box 142 and an interest level label (high/low). There are 26,127 far-infrared images that were collected and annotated and 77,291 bounding boxes in the collected data.

Three different error metrics were used to evaluate the performance of the model including. The first was an Average Displacement Error ("ADE"): Average distance ("L2") between a ground-truth location and a predicted bounding-box center. The second was a Final Displacement Error ("FDE"): The L2 distance between the ground truth location and the predicted bounding-box center at the final frame. The third was a Final Box Error ("FBE"): Mean square error between the ground-truth location and the predicted bounding-box at the final frame. For evaluation, training was performed with four sets of data and testing on one set of data as a leave-one-out strategy. Each training step was observed for two seconds and prediction errors were measured for another two seconds.

For the first stage of the intervention system 100, i.e., the animal detection stage 150, the large animal detection model 166, featuring Faster R-CNN with the ResNet101 backbone, was used for large animal detection. For the trajectory prediction, as shown in FIG. 11 and FIG. 12, the two stack of 60 Vanilla LSTM blocks were employed for each of the encoder 180 and the decoder 184 of the encoder-decoder model 172. Also, an additive alignment score function, e.g., the encoder concatenating MLP 200, for the temporal attention-fusion mechanism, e.g., the attention module 182, at the end of the encoder 180. The entire model 172 was trained end-to-end using stochastic gradient descent optimizer. Also, for the faster convergence, normalized values of the bounding box centers and aspect ratios were used. The disclosed model was implemented in Pytorch and trained on two NVIDIA TITAN RTX GPUs with 300 epochs. Additionally, providing image stabilization before the encoder as a preprocessing step will reduce noise and increase the motion estimation robustness.

Table 1, below, shows quantitative analysis results in terms of the average FDE, ADE and FBE. From the three metrics, it can be observed that the model is accurate in predicting the future trajectory (the center of the bounding-boxes). Additionally, the prediction performance degrades (by over 50%) when the prediction time is larger than the observation time.

In addition to the quantitative results of Table 1, some qualitative results of the future trajectory prediction are illustrated in FIGS. 11 and 12. Having the future trajectory of the large animal and the speed and trajectory of the vehicle, a contemporaneous intersection possibility, and a time to intersection can be estimated for each animal in the scene and if the contemporaneous intersection possibility is high the intervention, such as the alert to the driver, can be initiated.

The below table 1 includes average displacement, final, and box errors (ADE, FDE, FBE) across the test dataset. All models received two seconds of observation, while during the test time three different prediction windows (1, 2, and 4 seconds) were used. For better comparison, the error values were normalized by the size of the images.

| Average Error | 1 Second | 2 Seconds | 3 Seconds |
|---|---|---|---|
| ADE | 0.04 | 0.11 | 0.29 |
| FDE | 0.07 | 0.16 | 0.34 |
| FBE | 0.12 | 0.17 | 0.42 |

Figure 13:
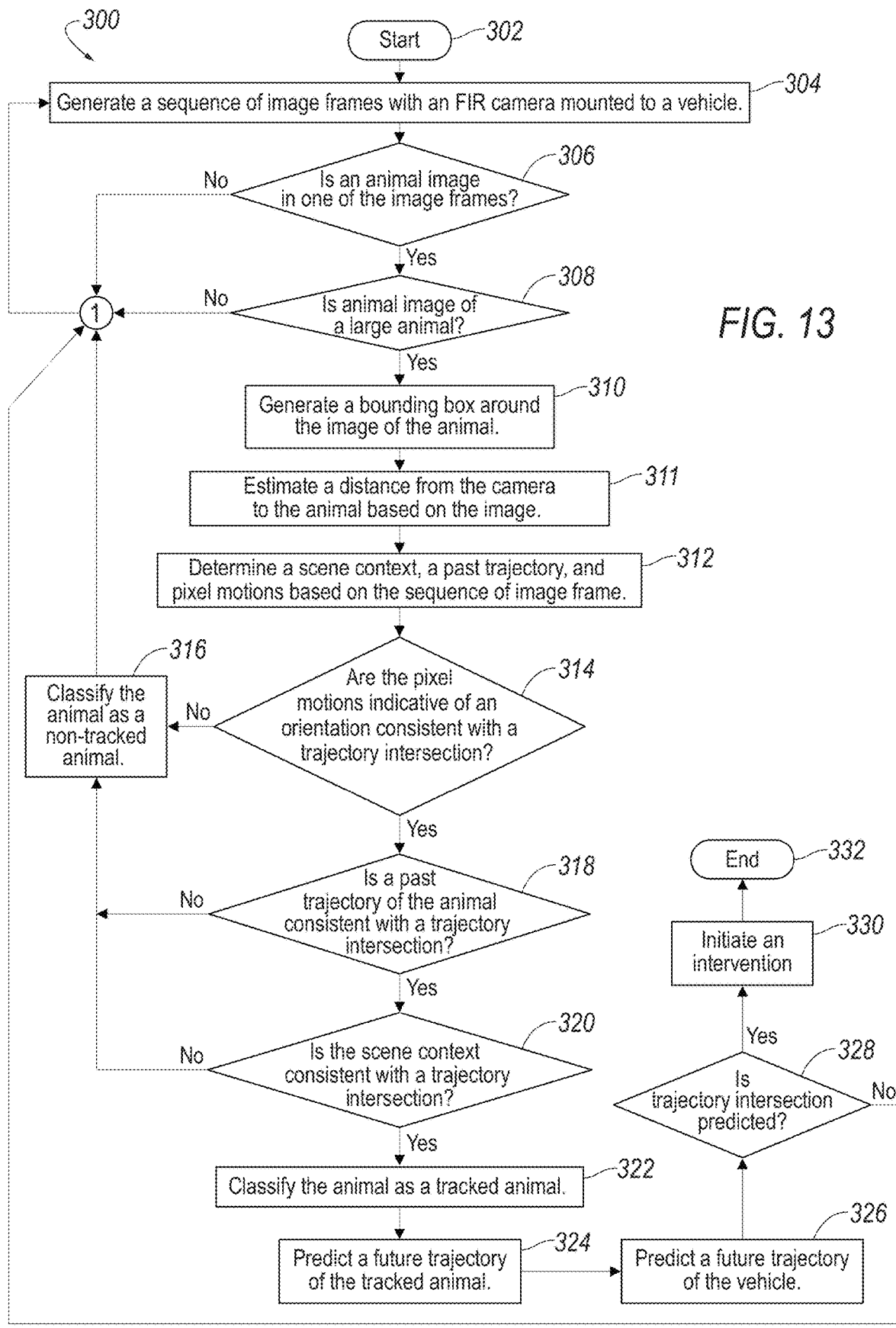
FIG. 13 is an example flow chart of an example process for predicting a future trajectory of a large animal.

FIG. 13 is a diagram of an example method, i.e., process 300, executed in the vehicle computer 110 according to program instructions stored in a memory thereof for initiating a vehicle intervention when the future animal trajectory 134 intersects the future vehicle trajectory 130. The process 300 includes multiple blocks that can be executed in the illustrated order. The process 300 could alternatively or additionally include fewer blocks or can include the blocks executed in different orders.

Process 300 begins in a start block 302. In the block 302, the computing device 110, i.e., the vehicle computer 110, receives data from one or more vehicle sensors 112, including the FIR camera 108, via the vehicle communication network 119, and/or from the remote server 104 via the network 106. The process 300 continues in a process block 304.

In the block 304, the vehicle computer 110 generates a sequence of image frames 138 with data from the FIR camera 108. The process 300 continues in a decision block 306.

In the block 306, the vehicle computer 110, based on data from the block 304, determines whether or not there is an animal image 140 in one of the image frames 138. When it is determined that there is not an animal image 140 in one of the image frames 138, the process 300 returns to the block 304 to continue generating image frames 138. When it is determined by the computer 110 that an animal image 140 is in one of the image frames 138, the process 300 continues in a decision block 308.

In the block 308, the vehicle computer 110, based on data from the block 308, determines whether or not the animal image 140 is of a large animal that the computer has been trained to recognize, such as a deer. When it is determined by the computer 110 that the animal image 140 is not of a large animal, the process 300 returns to the block 304 to continue generating image frames 138. When it is determined by the computer that the animal image 140 is of a large animal 120, the process continues in a process block 310.

In the block 310, the vehicle computer 110 generates a bounding box 142 around the animal image 140. The process 300 continues to a process block 311.

In the block 311, the vehicle computer 110, based on data from the block 310, estimates a distance from the camera 108 to the animal 120 based on the image frame 138, particularly based on factors that may include a size of the bounding box 142 and an intensity of pixels 139 defining the animal image 140. The process 300 then continues to a process block 312.

In the block 312, the vehicle computer 110, based on data from the block 311, determines a scene context, a past trajectory, and pixel motions. The process 300 then continues to a decision block 314.

In the block 314, the vehicle computer 110, based on data from the block 312, determines if the pixel motions are indicative of an orientation of the animal 120 consistent with a trajectory intersection. When the pixel motions are not indicative of the orientation of the animal 120 consistent with the trajectory intersection, the process 300 continues to a process block 316. When the pixel motions are indicative of the orientation of the animal 120 consistent with the trajectory intersection, the process 300 continues to a decision block 318.

In the block 318, the vehicle computer 110, based on data from the block 312, determines if a past trajectory of the animal 120 is consistent with a trajectory intersection. When the past trajectory of the animal 120 is consistent with the trajectory intersection, the process 300 continues to the process block 316. When the past trajectory of the animal 120 is consistent with the trajectory intersection, the process 300 continues to a decision block 320.

In the block 320, the vehicle computer 110, based on data from the block 312, determines if a scene context is consistent with a trajectory intersection. When the scene context is consistent with the trajectory intersection, the process 300 continues to the process block 316. When the scene context is consistent with the trajectory intersection, the process 300 continues to a decision block 322.

In the block 316, the vehicle computer 110, based on data from any of the blocks 314, 318, and 320, classifies the animal 120 as a non-tracked animal. The process 300 then returns to block 304.

In the block 322, the vehicle computer 110, based on data from each of the blocks 314, 318, and 320, classifies the animal 120 as a tracked animal. The process 300 then continues to a process block 324.

In the block 324, the vehicle computer 110, based on data from the block 322, predicts a future animal trajectory 134 of the tracked animal 120. The process 300 then continues to a process block 326.

In the block 326, the vehicle computer 110, based on data from the block 324, predicts a future vehicle trajectory 130 of the vehicle 102. The process 300 then continues to a decision block 328.

In the block 328, the vehicle computer 110, based on data from the block 326, determines if the future animal trajectory 134 of the tracked animal 120 and the future vehicle trajectory 130 of the vehicle 102. When the future animal trajectory 134 of the tracked animal 120 and the future vehicle trajectory 130 of the vehicle 102 do not intersect, the process 300 returns to block 304. When the future trajectory 134 of the tracked animal 120 and the future vehicle trajectory 130 of the vehicle 102 intersect, the process continues to a process block 330.

In the block 330, the vehicle computer 110, based on data from the block 328, initiates an intervention, such as providing a vehicle operator with a visual alert, such as displaying an icon of a leaping deer on the heads-up-display element, e.g., the windshield 144. The process 300 continues to an end block 332.

In the block 332, the process 300 ends.

Systems and methods described herein advantageously can predict the future location and trajectory of large animals independent of whether the animal is moving during most of the encoding sequence. Trajectory can also be successfully predicted when the animal makes sudden moves, or exhibit a different behavior. Trajectory predictions can also be made for multiple animals in each frame. Successful predictions can be made in low light and adverse weather conditions, with such flexibility being particularly benefitted by the use of attention weights. Additionally, the encoder-decoder model 172 is interpretable. That allows attention weights of the model 172 to be examined to determine what feature or input the model is using to make its predictions. The operation of the process flow 148 in a loop allows for continuous detection, trajectory prediction and tracking. The loop operation also makes the model 172 more robust with respect to overcoming possible occlusion of the animal 120 from visibility.

In addition to using FIR images, the proposed model could fuse FIR images with other sensory inputs such as RGB, radar, Lidar, etc. to increase the accuracy and robustness. For instance, knowledge distillation can be used in the present framework for transferring knowledge from a multimodal teacher model (e.g., FIR+RGB) to a single-modal (e.g., RGB) student model and increasing the robustness of trajectory prediction at nighttime without additional resources during inference. Future alternative configurations may include using Graph Neural Networks ("GNN") to model the interaction between large animals and vehicles.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, comprising a processor and a memory, wherein the memory stores instructions executable by the processor such that the computing device is programmed to:
   upon identifying an image of a large animal in an image frame obtained with a far-infrared camera mounted to a vehicle, wherein the identifying includes identifying a type of the large animal selected from a group including one or more of deer, bear, elk, horse, or cow:
   determine a pixel intensity of the large animal image;
   determine an estimated distance to the large animal from the far-infrared camera based on the pixel intensity;
   classify the large animal as one of a tracked animal and a non-tracked animal based on the large animal image, including a pose based on the type of the large animal and whether the pose indicates that the large animal is likely to occupy a road; and
   upon classifying the large animal as the tracked animal and upon determining that a future trajectory of the tracked animal and a future trajectory of the vehicle intersect, actuate a component in the vehicle.

2. The computing device of claim 1, wherein the computing device is further programmed to:
   generate a sequence of image frames; and
   predict the future trajectory of the tracked animal based on a past trajectory of the tracked animal, a scene context, and a pixel motion.

3. The computing device of claim 1, wherein the computing device is further programmed to generate a bounding box that bounds the large animal image.

4. The computing device of claim 3, wherein the computing device is further programmed to, prior to classifying the large animal, determine the estimated distance based on both the pixel intensity and on a size of the bounding box.

5. The computing device of claim 3, wherein the computing device is further programmed to:
   generate a sequence of image frames; and
   determine a past trajectory of the tracked animal based on a movement of the bounding box of the large animal image in the sequence of the image frames.

6. The computing device of claim 1, wherein the computing device is further programmed to:
   generate a sequence of image frames; and
   determine the future trajectory of the tracked animal based on a motion of pixels in the sequence of the image frames.

7. The computing device of claim 1, wherein the computing device is further programmed to:
   generate a sequence of image frames; and
   predict the future trajectory of the tracked animal by modeling the future trajectory with a convolutional long short term memory attention-based multi-stream encoder-decoder model that includes an attention module that assigns weights to vectors derived from a past trajectory of the tracked animal, a scene context, and a pixel motion.

8. The computing device of claim 1, wherein the component actuated comprises a heads-up display that displays a visual notification of the tracked animal to a vehicle operator.

9. The computing device of claim 1, wherein the computing device is further programmed to, prior to classifying the large animal, identify key points of the large animal image and their respective locations in the image frames to determine a pose of the large animal and include the pose as a factor in classifying the large animal.

10. A method of predicting a future trajectory of a large animal and actuating a component, the method comprising the steps of:
   upon identifying an image of a large animal in an image frame obtained with a far-infrared camera mounted to a vehicle, wherein the identifying includes identifying a type of the large animal selected from a group including one or more of deer, bear, elk, horse, or cow:
   determining a pixel intensity of the large animal image;
   determining an estimated distance to the large animal from the far-infrared camera based on the pixel intensity;
   classifying the large animal is classified as one of a tracked animal and a non-tracked animal based on the large animal image, including a pose based on the type of the large animal and whether the pose indicates that the large animal is likely to occupy a road; and
   upon classifying the large animal as a tracked animal and upon determining that the future trajectory of the tracked animal and the future trajectory of the vehicle intersect, actuating a component in the vehicle.

11. The method of claim 10, further comprising the steps of:
   generating a sequence of image frames; and
   predicting the future trajectory of the tracked animal based on a past trajectory of the tracked animal, a scene context, and a pixel motion.

12. The method of claim 10, further comprising the step of generating a bounding box that bounds the large animal image.

13. The method of claim 12, further comprising the step of, prior to classifying the large animal, determining the estimated distance based on both the pixel intensity and on a size of the bounding box.

14. The method of claim 12, further comprising the steps of:
   generating a sequence of image frames; and
   determining a past trajectory of the tracked animal based on a movement of the bounding box of the large animal image in the sequence of the image frames.

15. The method of claim 10, further comprising the steps of:
   generating a sequence of image frames; and
   determining the future trajectory of the tracked animal based on a motion of pixels in the sequence of the image frames.

16. The method of claim 10, further comprising the steps of:
   generating a sequence of image frames; and
   predicting the future trajectory of the tracked animal by modeling the future trajectory with a convolutional long short term memory attention-based multi-stream encoder-decoder model that includes an attention module and assigning weights to vectors derived from a past trajectory of the tracked animal, a scene context, and a pixel motion.

17. The method of claim 10, wherein the component being actuated comprises a heads-up display that displays a visual notification of the tracked animal to a vehicle operator.

18. The method of claim 10, further comprising the step of, prior to classifying the large animal, identifying key points of the large animal image and their respective locations in the image frames to determine a pose of the large animal and including the pose as a factor in classifying the large animal.

* * * * *